United States Patent
Rajshekar et al.

(10) Patent No.: US 9,621,528 B2
(45) Date of Patent: Apr. 11, 2017

(54) CREATING AND IMPLEMENTING SCALABLE AND EFFECTIVE MULTIMEDIA OBJECTS WITH HUMAN INTERACTION PROOF (HIP) CAPABILITIES, WITH CHALLENGES COMPRISING SECRET QUESTION AND ANSWER CREATED BY USER, AND ADVERTISEMENT CORRESPONDING TO THE SECRET QUESTION

(71) Applicant: EngageClick, Inc., Fremont, CA (US)

(72) Inventors: Manoj Rajshekar, Fremont, CA (US); Shekhar Kumar Deo, Santa Clara, CA (US)

(73) Assignee: 24/7 Customer, Inc., Campbell, CA (US)

(*) Notice: Subject to any disclaimer, the term of this patent is extended or adjusted under 35 U.S.C. 154(b) by 223 days.

(21) Appl. No.: 13/975,084

(22) Filed: Aug. 23, 2013

(65) Prior Publication Data

US 2014/0059663 A1    Feb. 27, 2014

Related U.S. Application Data

(63) Continuation-in-part of application No. 13/566,690, filed on Aug. 3, 2012.

(Continued)

(51) Int. Cl.
    *G06F 17/30*        (2006.01)
    *G06F 21/31*        (2013.01)
    (Continued)

(52) U.S. Cl.
    CPC ........ *H04L 63/08* (2013.01); *G06F 17/30017* (2013.01); *G06F 21/31* (2013.01);
    (Continued)

(58) Field of Classification Search
    CPC ....... G06F 17/30017; G06F 2221/2133; G06F 2221/2103; G06F 21/31; G06F 21/36; G06Q 30/0241; G06Q 30/0251; G06Q 30/0258

(Continued)

(56) References Cited

U.S. PATENT DOCUMENTS 5,933,811 A    8/1999   Angles et al.
7,904,517 B2 *   3/2011   Kang ................. G06Q 20/3674
                                                         705/67

(Continued)

OTHER PUBLICATIONS

Jacobs, Ron, "How to do API Key Verification for REST Services in .NET 4", Jun. 14, 2010 http://blogs.msdn.com/b/rjacobs/archive/2010/06/14/how-to-do-api-key-verification-for-rest-services-in-net-4.aspx,.

*Primary Examiner* — Cesar Paula
*Assistant Examiner* — Yahao Chen
(74) *Attorney, Agent, or Firm* — Perkins Coie LLP; Michael A. Glenn

(57) ABSTRACT

Embodiments of the invention provide a method and apparatus ("system") that overcome the above-mentioned problems among others and provide an innovative solution aimed at creating an interactive, dynamic and effective multi-media object with HIP capabilities which may be used in online advertising, security, and user-defined security. The system leverages the existing HIP CAPTCHA real estate to create multi-media objects that guarantee a captivated audience, especially in online advertising. Combining interactive multi-media objects with HIP capabilities helps to meet a very critical need faced by advertisers and websites today—creating an effective impression of any multi-media object on a user (a guaranteed eyeball). Embodiments of the current invention introduce a variety of formats that involve inter- (Continued)

acting with a multi-media object to provide a more natural user interaction and ease of use while maintaining security.

19 Claims, 17 Drawing Sheets

Related U.S. Application Data

(60) Provisional application No. 61/515,636, filed on Aug. 5, 2011, provisional application No. 61/692,343, filed on Aug. 23, 2012.

(51) Int. Cl.
    *G06F 21/36*     (2013.01)
    *G06Q 30/02*     (2012.01)
    *H04L 29/06*     (2006.01)

(52) U.S. Cl.
    CPC ......... *G06F 21/36* (2013.01); *G06Q 30/0241* (2013.01); *G06Q 30/0251* (2013.01); *G06Q 30/0258* (2013.01); *G06Q 30/0277* (2013.01); *H04L 63/12* (2013.01); *G06F 2221/2103* (2013.01); *G06F 2221/2133* (2013.01)

(58) Field of Classification Search
    USPC .................................................. 715/201, 202
    See application file for complete search history.

(56) References Cited

U.S. PATENT DOCUMENTS

| | | | |
|---|---|---|---|
| 8,473,336 B1 | 6/2013 | Simmons | |
| 8,510,795 B1* | 8/2013 | Gargi | 726/2 |
| 8,542,251 B1 | 9/2013 | Gossweiler, III et al. | |
| 8,595,186 B1* | 11/2013 | Mandyam | G06F 8/38 |
| | | | 707/632 |
| 8,621,578 B1 | 12/2013 | Lee et al. | |
| 8,892,673 B1* | 11/2014 | Emigh et al. | 709/207 |
| 2004/0003258 A1 | 1/2004 | Billingsley et al. | |
| 2005/0120201 A1* | 6/2005 | Benaloh | G06F 21/31 |
| | | | 713/155 |
| 2005/0138376 A1 | 6/2005 | Fritz et al. | |
| 2005/0288954 A1* | 12/2005 | McCarthy | A61B 5/6815 |
| | | | 705/2 |
| 2007/0033102 A1* | 2/2007 | Frank | G06Q 30/02 |
| | | | 705/14.44 |
| 2007/0101010 A1* | 5/2007 | Ellison | G06F 21/36 |
| | | | 709/229 |
| 2007/0234423 A1* | 10/2007 | Goodman et al. | 726/21 |
| 2007/0255953 A1* | 11/2007 | Peyret | H04L 9/32 |
| | | | 713/168 |
| 2007/0283416 A1 | 12/2007 | Renaud et al. | |
| 2008/0005126 A1 | 1/2008 | Sankaran et al. | |
| 2008/0109657 A1* | 5/2008 | Bajaj et al. | 713/168 |
| 2008/0133321 A1 | 6/2008 | Pennock et al. | |
| 2008/0133347 A1 | 6/2008 | Josifovski et al. | |
| 2008/0133348 A1 | 6/2008 | Reed et al. | |
| 2008/0147456 A1 | 6/2008 | Broder et al. | |
| 2009/0012855 A1 | 1/2009 | Jamal et al. | |
| 2009/0150983 A1* | 6/2009 | Saxena | G06F 21/36 |
| | | | 726/7 |
| 2009/0186635 A1 | 7/2009 | Vieri | |
| 2009/0204819 A1 | 8/2009 | Parker | |
| 2009/0210937 A1 | 8/2009 | Kraft et al. | |
| 2009/0232351 A1* | 9/2009 | Kagitani et al. | 382/100 |
| 2009/0249476 A1 | 10/2009 | Seacat et al. | |
| 2009/0249477 A1* | 10/2009 | Punera | G06F 21/31 |
| | | | 726/18 |
| 2009/0319271 A1* | 12/2009 | Gross | 704/246 |
| 2009/0328175 A1* | 12/2009 | Shuster | G06F 21/36 |
| | | | 726/7 |
| 2010/0031287 A1 | 2/2010 | Simon et al. | |
| 2010/0037147 A1 | 2/2010 | Champion et al. | |
| 2010/0049526 A1* | 2/2010 | Lewis et al. | 704/273 |
| 2010/0201478 A1 | 8/2010 | Veen et al. | |
| 2010/0287229 A1* | 11/2010 | Hauser | G06F 21/316 |
| | | | 709/203 |
| 2010/0302255 A1 | 12/2010 | Brown et al. | |
| 2010/0306055 A1* | 12/2010 | Kolb | G06Q 30/0257 |
| | | | 705/14.55 |
| 2010/0318669 A1 | 12/2010 | Chugh | |
| 2011/0029781 A1 | 2/2011 | Clark et al. | |
| 2011/0029902 A1 | 2/2011 | Bailey | |
| 2011/0106631 A1 | 5/2011 | Lieberman | |
| 2011/0150267 A1* | 6/2011 | Snelling | G06F 21/316 |
| | | | 382/100 |
| 2011/0159842 A1* | 6/2011 | Vander Veen et al. | 455/410 |
| 2011/0166916 A1 | 7/2011 | Inbar | |
| 2011/0196722 A1* | 8/2011 | Punera | G06Q 30/0185 |
| | | | 705/14.11 |
| 2011/0209076 A1* | 8/2011 | Saxena | G06F 21/36 |
| | | | 715/764 |
| 2011/0258024 A1 | 10/2011 | Prince | |
| 2011/0276410 A1* | 11/2011 | Hjelm et al. | 705/14.66 |
| 2012/0054834 A1* | 3/2012 | King | G06F 21/31 |
| | | | 726/4 |
| 2012/0130801 A1 | 5/2012 | Baranov et al. | |
| 2012/0130802 A1 | 5/2012 | Shimizu | |
| 2012/0154434 A1 | 6/2012 | Costea | |
| 2012/0192252 A1 | 7/2012 | Kuo et al. | |
| 2012/0246008 A1 | 9/2012 | Hamilton, II et al. | |
| 2012/0254940 A1* | 10/2012 | Raper | G06Q 20/4014 |
| | | | 726/3 |
| 2012/0254964 A1* | 10/2012 | Kumar et al. | 726/7 |
| 2012/0254971 A1 | 10/2012 | Hu et al. | |
| 2012/0297190 A1 | 11/2012 | Shen et al. | |
| 2013/0007872 A1* | 1/2013 | Hariharan et al. | 726/17 |

\* cited by examiner

401. TAKE A VIDEO FILE

402. SPLIT INTO RANDOMLY SEQUENCED PIECES

403. TAKE USER DEFINED IMAGES

404. ASSOCIATE CHALLENGES & RESPONSES (TYPE-IN & CLICKABLE HOTSPOTS) FROM PREVIOUS PATENT

405. STITCH THE IMAGES (PET PICTURES) WITH VIDEO SPLITS & CREATE A NEW VIDEO FILE.

406. ASSOCIATE THIS TO A PROFILE (SITE, USER, ETC) & USE THIS AS A SECURITY CHALLENGE

501 — SECRET QUESTION 1:   WHAT IS THE NAME OF YOUR CAR?

502 — ANS:

PROVE YOU ARE A HUMAN

503 — "CLICK ON CAR IN THE IMAGE"

504

505 — SECRET QUESTION 2:   WHAT IS YOUR FAVORITE FOOD?

506 — ANS:

PROVE YOU ARE A HUMAN

507 — "TYPE IN THE NAME OF THE RESTAURANT ADVERTISED"

508

509 — TYPE IN HERE

USER SIGN-UP/REGISTRATION

USER ID: ☐

PASSWORD: ☐

•
•
•

SECRET QUESTIONS

Q1: TAP ON THE STREET WHERE YOU MET YOUR SPOUSE

Q2: TAP ON THE STREET WHERE YOU WENT TO PRE-SCHOOL

RELATIONSHIPS: PATTERN MATCHING

OBJECTS: SOURCE AND TARGET IMAGES

INTERACTION: CLICK ON THE MATCHING TARGET IMAGE

TEMPLATE: SOURCE AND TARGET CONTAINERS

CREATING AND IMPLEMENTING SCALABLE AND EFFECTIVE MULTIMEDIA OBJECTS WITH HUMAN INTERACTION PROOF (HIP) CAPABILITIES, WITH CHALLENGES COMPRISING SECRET QUESTION AND ANSWER CREATED BY USER, AND ADVERTISEMENT CORRESPONDING TO THE SECRET QUESTION

CROSS REFERENCE TO RELATED APPLICATIONS

This patent application is a continuation-in-part of U.S. patent application Ser. No. 13/566,690, SYSTEM AND METHOD FOR CREATING AND IMPLEMENTING DYNAMIC, INTERACTIVE AND EFFECTIVE MULTI-MEDIA OBJECTS WITH HUMAN INTERACTION PROOF (HIP) CAPABILITIES, filed Aug. 3, 2012, which claims benefit of U.S. Provisional Patent Application Ser. No. 61/515,636, SYSTEM AND METHOD FOR CREATING AND IMPLEMENTING DYNAMIC, INTERACTIVE AND EFFECTIVE MULTI-MEDIA OBJECTS WITH HUMAN INTERACTION PROOF (HIP) CAPABILITIES, filed Aug. 5, 2011, and this patent application also claims benefit of U.S. Provisional Patent Application Ser. No. 61/692,343, SYSTEM AND METHOD FOR CREATING AND IMPLEMENTING SCALABLE AND EFFECTIVE MULTI-MEDIA OBJECTS WITH HUMAN INTERACTION PROOF (HIP) CAPABILITIES, filed Aug. 23, 2012, the entirety of each of which is incorporated herein by this reference thereto.

BACKGROUND OF THE INVENTION

Technical Field

This invention relates generally to the field of multimedia objects and human interactive proof (HIP) technology. More specifically, techniques are provided that involve interacting with a multimedia object to provide a more natural user interaction and ease of use while maintaining security.

Description of the Related Art

The growth of Internet usage across different interfaces and devices has led to widespread adoption across all demographics. The number of websites is ever increasing and more financial transactions happen on the internet. Websites are widely used to provide users with a convenient means to order products such as tickets, to access personal account information, to open new email accounts, to add content to existing content like comments on blogs, uploading multi-media content on websites or to access other services. These systems are not only convenient to website owners as well as to their users, but they also reduce overall costs.

Unfortunately such systems can also provide a loophole, through which hackers can obtain access to personal or other restricted data, disrupt services, poison existing content with irrelevant information declining the value of existing content, consume all the resources of the website for malicious activities and distribute worms or spam. This is done commonly through the use of automated bots, scripts, and other malicious computer programs.

This has led to the development of Human Interactive Proof (HIP) technology. HIPs are challenges designed to be solved by humans, so that they aren't discouraged from using a service. At the same time the HIP must be difficult enough to make the cost of developing or processing a malicious bot, script to break it, uneconomical and challenging. One form of such HIP which is widely used is CAPTCHAs ("Completely Automated Public Turing test to tell Computers and Humans Apart", also referred to herein as "captcha" or "captchas," i.e. not in full caps). Captcha technology is a challenge-response system as an attempt to ensure the response is from a human and this helps to isolate the human traffic from the malicious bot, script traffic. Captchas are fast becoming pervasive across the internet as sites move towards collaborative user-generated content making the need for distinguishing genuine users from bots and scripts, and maintaining user privacy more critical. However, captchas may not be very user friendly and occupy precious real estate without providing any monetization.

Online advertising has emerged as an important element of any advertising campaign. However, the effectiveness of the existing ad formats such as online banner ads is far from optimal. Several banner ads on a webpage crave for attention and has led to a phenomenon called banner blindness. Banner blindness is a phenomenon in web usability where visitors or a website ignore banner-like information. And web usability tests are regularly proving that knowingly or unknowingly the users are ignoring banner ads or images which appear in banner form.

SUMMARY OF THE INVENTION

Embodiments of the invention provide a method and apparatus ("system") that overcome the above-mentioned problems among others and provide an innovative solution aimed at creating an interactive, dynamic and effective multi-media object with HIP capabilities which may be used in online advertising, security, and user-defined security. The system leverages the existing HIP CAPTCHA real estate to create multi-media objects that guarantee a captivated audience, especially in online advertising. Combining interactive multi-media objects with HIP capabilities helps to meet a very critical need faced by advertisers and websites today—creating an effective impression of any multi-media object on a user (a guaranteed eyeball). Embodiments of the current invention introduce a variety of formats that involve interacting with a multi-media object to provide a more natural user interaction and ease of use while maintaining security.

DETAILED DESCRIPTION OF THE INVENTION

Figure 1:
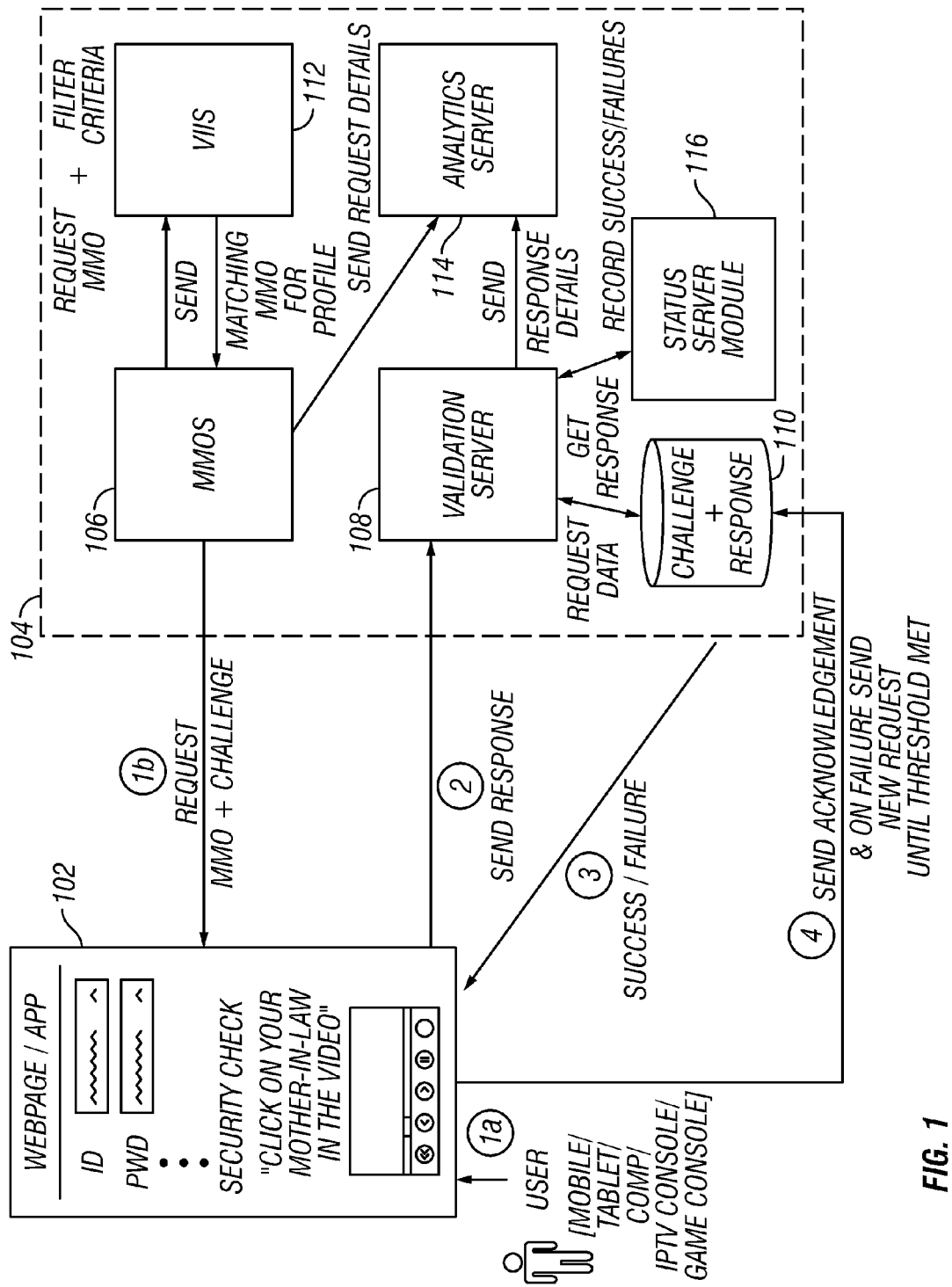
FIG. 1 is an architectural diagram of a system for generating and serving scalable and effective multimedia objects with human interaction proof (HIP) capabilities on a webpage or an application, according to an embodiment.

Embodiments of the invention provide a method and apparatus ("system") that overcome the above-mentioned problems among others and provide an innovative solution aimed at creating an interactive, dynamic and effective multi-media object with HIP capabilities which may be used in online advertising, security, and user-defined security. The system leverages the existing HIP CAPTCHA real estate to create multi-media objects that guarantee a captivated audience, especially in online advertising. The idea of combining interactive multi-media objects with HIP capabilities helps to meet a very critical need faced by advertisers and websites today—creating an effective impression of any multi-media object on a user (a guaranteed eyeball). Also, the current format of CAPTCHAs involve deciphering distorted text which is usually difficult to do and causes a break in the natural flow of the user's interaction with the web site.

Embodiments of the current invention, aims to introduce a variety of formats that involve interacting with a multi-media object to provide a more natural user interaction and ease of use while maintaining security.

TERMINOLOGY

For purposes of understanding embodiments herein, the following terminology and acronyms may be used:

A Multimedia Object (MMO) may be any multimedia item such as an online advertisement, a static image, a video, an audio, and text. Further, it should be appreciated that such MMO may or may not have HIP embedded in it. An MMO may be interactive or non-interactive. An MMO may be comprised of rich media for example.

Multimedia object server (MMOS) is a server which serves MMOs as described hereinabove.

Validation and Verification server (VS) is a server which validates and verifies user response against the HIP challenge.

Multimedia object administration server (MMOAS) is a server which administrates the MMOs and contains additional information, e.g. metadata, for all MMOs.

HIP—Human Interaction Proof is a technology that is presented via a programmed system to a user to help ensure that a human being, as opposed to an automated system, is interacting with the programmed system. It is generally presented as a challenge to the user, and is also known as a CAPTCHA or a HIP challenge or a HIP CAPTCHA, for which a valid response from user is expected. A challenge of HIP can be described as any system interaction which system generates and sends to the user to make and enable user to perform the intended interaction on the system to ensure that the interaction is made only from a human. A response can be described as the interactions with the system which are done on the posed challenge to ensure that the user who interacted is human. For example, the challenge can be a text message "drag this picture from point A to point B" appearing on computer screen, for which the response is the dragging action of the picture by the user on the computer screen. It should be appreciated that a Human Interaction Proof system may or may not include multimedia objects.

Analytics Server (AS) is a server which performs operations including storing all the session information in a database configured to report and provide analytics.

Video Image Integration Server (VIIS) is a server which combines input video with other multi-media, e.g. images, and generates a resultant video, also referred to as a combined video, with or without metadata, e.g. embedded tags.

Status Server Module (SUS) is a module or application that stores how many successes or failures happened for a session to allow a limited number of tries to identify the user rightly, before locking the user id for too many failed attempts.

SUMMARY OF FEATURES

Following is a summary list of features that are provided by one or more embodiments herein. Detailed discussion about each feature is provided hereinbelow.

Combination of user specified video and used as a challenge to identify the right user.

Combination of user specified video+multiple images which are user defined and used as a challenge to identify the right user.

Secret questions used to validate a user's identity are classified with certain ad types and every time the secret questions are shown, corresponding ads are shown and used as a challenge.

Interactive Multimedia Object (MMO) serving HIP (Human Interaction Proof) features and whose valid responses are a combination of response from the image and response dependent on the content where this MMO is being served. This is a multi-phase validation using the content as one or multiple sources and the interaction as another source.

Use web mapping technology to act as an interactive MMO which helps identify the user as well as serve the purpose of HIP. A high level dataflow diagram is illustrated in FIG. 1.

Methods to create a scalable challenge for a media to provide HIP support.

Methods to create hybrid challenges and response system to increase the efficiency of HIP.

Methods to measure engagement on HIP media.

Methods to provide multiple known images with some unknown images that act as noise.

Methods to translate languages using HIP media.

Methods to use contextual and demography based international languages to create challenge and response systems.

Methods to provide support for in-premise and house-media to publishers/advertisers/media platforms.

Multi-factor authentication agent.

Methods to provide flexibility to pick media source.

Methods to provide HIP support to Smart TV.

Text based ad HIP.

Template based HIP.

Human computation methods using the system.

Social categorization using HIP.

HIP Analytics.

Tools with HIP enablement feature.

It should be appreciated that the above-cited list of features is not meant to be exhaustive and are for illustrative purposes for understanding embodiments herein.

Data Flow Between Key Components

An Exemplary Embodiment

An embodiment can be understood with reference to FIG. 1, an architectural diagram of a system for generating and serving scalable and effective multimedia objects with human interaction proof (HIP) capabilities on a webpage or an application. A user opens a webpage or application 102 from any device (not shown), such as but not limited to, mobile, tablet, computer, internet protocol television (IPTV) console, or game console (Step 1a). Webpage or application 102 comprises a widget (not shown) which is configured to request an MMO and a challenge from an MMOS 106 (Step 1b), which is a component of an engagement server 104. A description of an embodiment of the widget can be found in co-assigned patent application Ser. No. 13/566,690, which is incorporated herein by this reference thereto. The user is presented with the MMO which has a challenge. For illustrative purposes only, the webpage or application shows a video and an accompanying question, "Click on your mother-in-law in the video." After the user responds to the challenge, the response is sent from webpage or application 102 to a validation server 108 of engagement server 104 (Step 2). Validation server 108 determines whether the response matches a stored, validating response and sends an a success or failure message back to webpage or application 102 (Step 3). When the message is the success message, webpage or application 102 sends an acknowledgement back to a challenge and response repository 110 of engagement server 104 (Step 4). When the message is the failure message, webpage or application 102 sends a new request to engagement server 104, which specifically is received by MMOS 106, until a predetermined threshold number of times of sending a new request upon failure is met (Step 4).

In an embodiment, engagement server 104 also comprises a VIIS 112. VIIS 112 receives a request from MMOS 106 for an MMO containing a video based on received filter criteria. Examples of such filter criteria are described hereinbelow regarding MMOs having or being video. VIIS 112 finds a matching MMO with video based on the filter criteria or profile information and returns such MMO to MMOS 106.

In an embodiment, engagement server 104 also comprises an AS 114. AS 114 receives any details and metadata regarding the request from MMOS 106 and any details and metadata regarding the response from VS 108. AS 114 is configured to store such informational data, perform analytics on such informational data, and provide results, such as in report format, on such analyzed and raw informational data. An exemplary AS 114 is described in co-assigned patent application Ser. No. 13/566,690, which is incorporated herein by this reference thereto.

In an embodiment, engagement server 104 also comprises a SUS 116. SUS 116 receives and records the occurrences of successful and failed responses from VS 108. The communication is bi-directional should VS 108 need to access data in SUS 116.

In an embodiment, VS 108 requests challenge and response data from challenge and response repository 110. The communication is bi-directional and challenge and response repository 110 may also request data from VS 108.

A User Specified Video and its Use as a Challenge to Identify the Right User

Typically, the MMOs used to isolate malicious bots on websites have various modes of security to distinguish human traffic, known as HIP. Standard HIP proof is implemented at the website level. However, embodiments herein address the user level and uses the same MMO to identify a specific user and to distinguish HIP from bots. This user specific security HIP module (UHIP) which acts both as a HIP proof and also as a security mechanism may be implemented in the cloud or in an appliance. For instance, a user defined video may be chosen to uniquely identify the user and also as the HIP proof, the details of which are discussed herein.

For example, a user uploads his/her marriage video and tags people and interesting details about the people. This is used by a randomizer to challenge the user later on to prove his identity. In an embodiment, the randomizer is a module which is part of MMOS and picks a random video id and question id for a specific user and such information is fetched from the database/storage repository at a later point in time. For instance, the user may be asked to please click on the brother's father-in-law or to click on the bride's grandmother and to type in her name.

An embodiment is described below.

1. A user goes to a website which needs to identify users uniquely. Also the website uses HIP to filter out non-human traffic.

2. The user is presented with an option to upload a video of his choice. The video may be from various sources including but not limited to local computer, cloud, private repository, public domain or network. On the video, using any standard video editing software, which is application software that handles post-production video editing of digital video sequences on a computer, the user may tag pertinent information at the frame level. The embodiment creates image maps at the frame level of tags of objects in the frame.

3. The video along with the tags are associated to the user's profile and stored persistently in a database.

Figure 2:
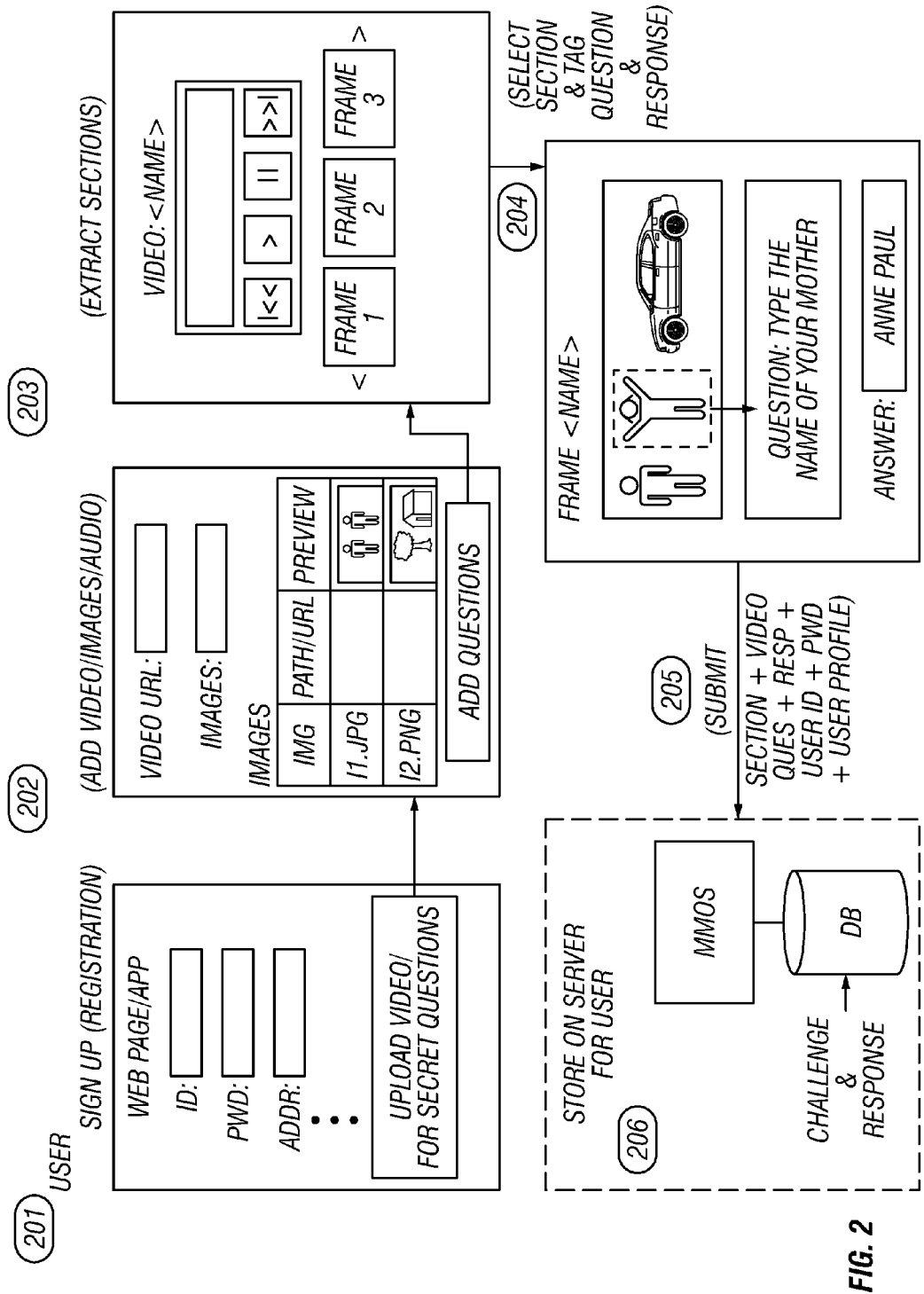
FIG. 2 is a flow diagram of a video based HIP being created and associated to a user profile, according to an embodiment.

One or more embodiments can be understood with reference to FIG. 2, a sample flow of a video based HIP is created and associated to a user profile, and as described hereinbelow.

Step 201) In a User signup/registration form, the user profile details such as but not limited to UserID, password, address, etc. are asked. As well, an option is provided to upload video, or other multimedia content in other use cases, and to create secret questions and answers. Session information from the page is sent to MMOS to provide a unique id for the user.

Step 202) A video file is provided and the file may be located locally or at any http URL. Along with such file additional images may also be provided. The system creates unique ids for the video and any images and associates such unique ids to the unique id of the user. The video file and the images information is sent to MMOS and the unique ids for video and images are created and assigned to the user id from the previous step.

Step 203) With use of video editing software, the individual frames or sections of the video are extracted and shown as a list to the user. The extracted frames or sections are assigned unique ids and associated to the unique video id, from the previous step. The unique ids for the frames and sections are generated from MMOS after information from this step is sent. These ids are tied to the video id from the previous step.

Step 204) The user chooses a specific section or frame and highlights a specific area or object in the image and tags it with a question and an answer for that question. For example, in the figure in a particular frame, the user may highlight the lady and specify "Type the name of your mother" and the corresponding answer would be "Anne Paul". Another variation of the question for smartphones may be "tap on your mother's face" and the co-ordinates from the highlighted section are stored as an answer. As well, one or many question and answer sets may be created on a specific frame/section of the video or across multiple frames/sections of the video.

Step 205) The data from step 204) are submitted to MMOS. Unique question id and answer id are generated by MMOS and associated with the frame id of the video id from previous steps. All such ids are tied to the user id.

Step 206) The data from step 205) are stored in the database/storage repository.

The steps described hereinabove explain one or more embodiments of the video tagging process.

Following are further steps describing one or more embodiments for the serving process for user identification (not pictured.)

Next, when the user identification is required and when there is a requirement to filter out no-human traffic (HIP), the user is posed with the video and asked by the randomizer module to identify a randomly chosen image from the video, which has earlier been tagged. The randomizer module is part of MMOS and picks a random video id and question id for the specific user. Such information is fetched from the database/storage repository. MMOS sends the video and the metadata related to the question and video to the requesting page. It also sends in device information requesting the information such as but not limited to desktop browser, smartphone, tablet, smart-tv, and so on.

The requesting webpage or application displays the video as the challenge in an HIP form (e.g. type-in, video, audio) and has a placeholder attribute to capture the user response. Examples may include but are not limited to the text entered as a response, the attributes of a click, the co-ordinates of the drag and drop action on the MMO, the response from haptic technology on supporting devices, and touch and tactile sensors on supporting devices. From the example described in FIG. 2, for the specific user, the requesting webpage or application might load the video and one of the questions may be "Type the name of your mother".

MMOS also parses the requesting device information and has a preset list of device capabilities in the database such as but not limited to tap, swipe, gesture, and audio capabilities of the device. MMOS uses the device information to choose the HIP, e.g. questions (see the FIG. 2 example) such as "tap on your mother's face," based on the device capabilities. It should be appreciated that such capability of MMOS is not limited to the discussion of and use of video, but applies to requesting any MMOS with HIP capability from any type of device.

A session id is created by MMOS and information about the request such as time requested, user id, video id, question id, and device type are stored in the database about the session sent to the requesting page.

- The user interacts with the video and the interaction attributes, e.g. the text entered as a response, the attributes of a click, the co-ordinates of the drag and drop action on the MMO, the haptic technology on supporting devices, and touch and tactile sensors on supporting devices such as touch-screen monitors, computers, smart-phones, and game consoles, are sent to the validation server (VS).
- The Validation Server (VS) validates the response attributes to the challenge served for the MMO and verifies it with the dataset for a possible match. VS verifies the response sent for the session id and compares it to the data stored in the database for validity of the response for the question sent for that frame id, video id, and user id for that session.
- When the response satisfies the challenge, a success message is sent to the webpage by the MMOS and statistics about the request, e.g. the timestamp, website which requested, user details if exists, and IP address, are sent to the Analytics Server (AS). AS stores the session information in a database intended for reporting and providing analytics.
- When the response does not fulfill the challenge posed, VS sends a failure notification to the webpage and updates the Status Server Module (SUS) with the failed status. SUS stores how many successes or failures occurred for a session and allows a predetermined, limited number of tries to identify the user correctly, before locking the user id for too many failed attempts. This is to prevent brutal attack mechanisms to breaking into a user's account. The threshold of tolerated failed attempts is stored in a database associated with SUS.
- The webpage indicates failure to the user and sends a request for a new MMO with a challenge to the MMOS, when the threshold for allowable failures is still unreached.
- The process repeats from the first bulleted step hereinabove unless the number of failures threshold is reached by the website or success is met.

Figure 3:
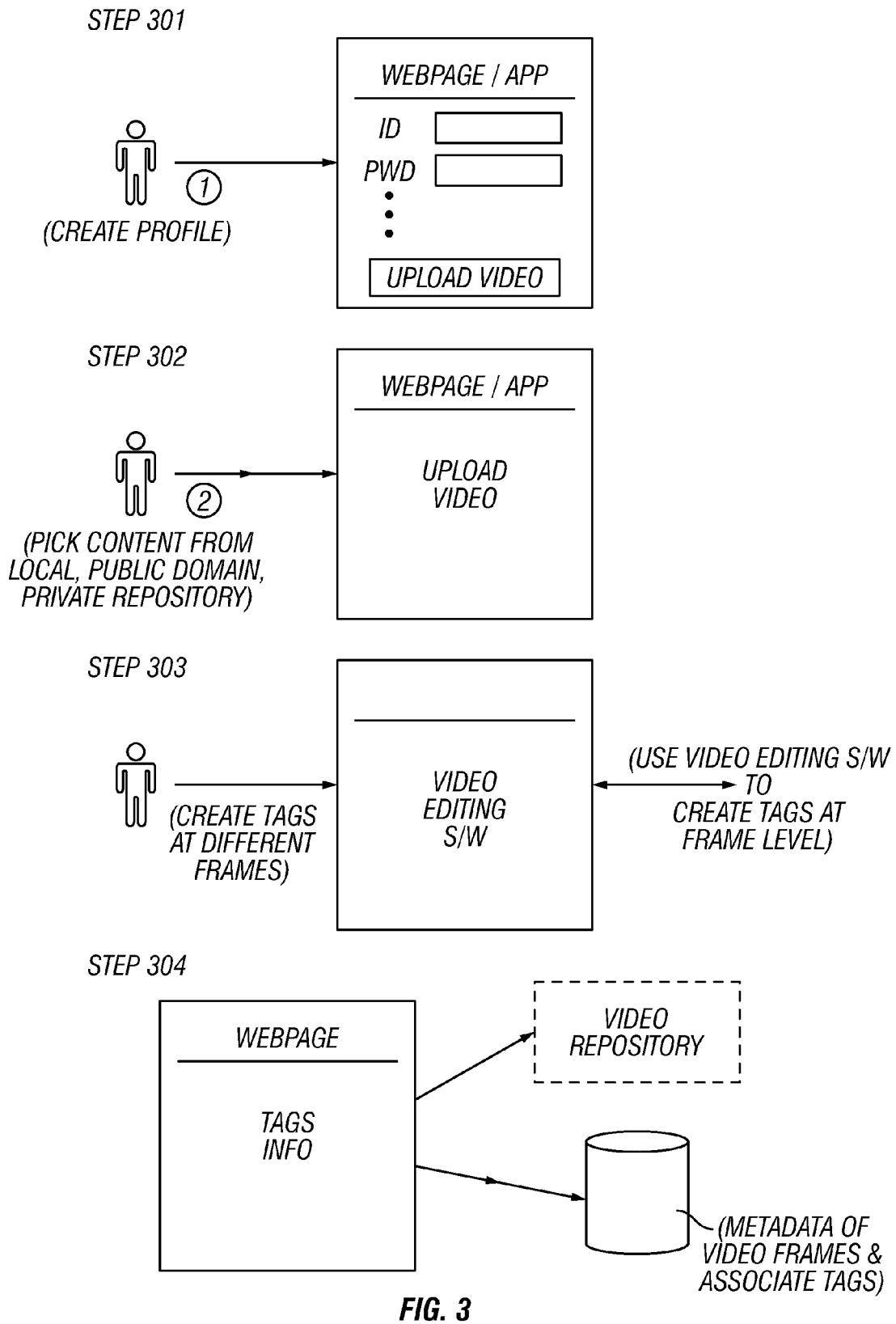
FIG. 3 is a flow diagram of a user specified video and its use as a challenge to identify the correct user, according to an embodiment.

An embodiment of using a user specified video and its use as a challenge to identify the correct user can be understood with reference to FIG. 3, a flow diagram. At step 301, a user creates a profile on a webpage or application. The webpage or application has an GUI element for the user to choose to upload a video. At step 302, the user uploads the video. As well, the webpage or application is configured to allow the user to select video and in other embodiments other content from local repositories, the public domain, or private repositories. At step 303, the user, using video editing software, is able to create tags at the frame level for the uploaded video. The system is configured to allow the user to creates tags at different frames within the same video. At step 304, the video is stored in a video repository and the tags and related metadata of video frames and associated tags are stored in a metadata repository. It should be appreciated that the video and metadata may be stored in a single repository or in other embodiments, such as the cloud and that the embodiment shown in FIG. 3 is by way of example and should not be limiting.

Stitching User Specified Video and User Defined Multiple Images and Using the Resultant Multimedia as a Challenge to Identify the Correct User In an embodiment, a user specific security HIP module (UHIP) acts both as HIP proof and also as a security mechanism and may be implemented on the cloud or in an appliance. As well, in this case a user defined video is chosen to uniquely identify the user and the user has an option to include one or more images along with the video. The images are stitched in the video and the resultant video is used to as a HIP mechanism. One skilled in the art would readily recognize that image stitching in the video can be performed by using various applications in the market and that image stitching processing does not need to be taught herein.

For example, a user uploads his vacation trip video and tags many people and interesting details about the people. As well, he uploads several images of his friends. The Video Image Integration Server (VIIS) may combine these two MMO types and generate a combined video. Such combined video may be used by the randomizer module to challenge him at a later time to prove his identity. For example, such challenge may be please click on your friend who is standing in the line to take the roller coaster ride.

An embodiment of using the image stitching processing is described hereinbelow.

1. A user goes to a website which needs to identify users uniquely. Also the website uses HIP to filter out the non-human traffic.

2. The user is presented with an option to upload a video of his choice. On the video he may tag pertinent information at the frame level.

3. Also, he may have the option to choose or upload a single or multiple images. And for all these images he may define and associate user defined tags persistently in a database.

4. The video and the images, along with the tags are associated to the user's profile and stored persistently.

5. The Video Image Integration Server (VIIS) combines this video with the images and generates a resultant video associated with this user which has the images and tags embedded. The combined video and created metadata are stored in the database/storage repository.

A sample flow in accordance with an embodiment may be understood with reference to FIG. 2, as further described hereinbelow:

Step 201) In a User signup/registration form, the user profile details such as but not limited to UserID, password, address, etc. are asked. As well, an option is provided to upload video, or other multimedia content in other use cases, and to create secret questions and answers. Session information from the page is sent to MMOS to provide a unique id for the user.

Step 202) A video file is provided and the file may be located locally or at any http URL. Along with such file additional images may also be provided. The system creates unique ids for the video and any images and associates such unique ids to the unique id of the user. The video file and the images information is sent to MMOS and the unique ids for video and images are created and assigned to the user id from the previous step.

Step 203) With use of video editing software, the individual frames or sections of the video are extracted and shown as a list to the user. The extracted frames or sections are assigned unique ids and associated to the unique video id, from the previous step. The unique ids for the frames and sections are generated from MMOS after information from this step is sent. These ids are tied to the video id from the previous step. The user is presented an option to insert the individual images uploaded in the previous step between different sections in the video. In a standard video editing software, a user may have options to split a video at different sections and add images and stich such sections and images together as one resultant video. Such capability is handled by VIIS for that session, user id, video id, frame id, and image id. The information is sent from the page to MMOS and to VIIS. After conversion into the resultant video, the information is sent back by MMOS to the page where questions and responses need to be created.

Step 204) The user chooses a specific section or frame and highlights a specific area or object in the image and tags it with a question and an answer for that question. For example, in the figure in a particular frame, the user may highlight the lady and specify "Type the name of your best friend shown after the end of the roller coaster ride" and the corresponding answer may be "Anne Paul". Another variation of the question for smartphones may be "tap on Anne Paul" and the co-ordinates from the highlighted section are stored as an answer. As well, one or many question and answer sets may be created on a specific frame/section of the video or across multiple frames/sections of the video.

Step 205) The data from step 4) are submitted to MMOS. Unique question id and answer id are generated by MMOS and associated with the frame id of the video id from previous steps. All such ids are tied to the user id.

Step 206) The data from step 5) are stored in the database/storage repository.

The steps described hereinabove explain one or more embodiments of the video tagging process.

Following are further steps describing one or more embodiments for the serving process for user identification (not pictured.)

Next, when the user identification is required and also when there is a requirement to filter out no-human traffic (HIP), the user is posed with the combined video and asked by the randomizer module to identify a randomly chosen image from the video, which has earlier been tagged.

The webpage displays the video as the challenge in a HIP form (e.g. type-in, video, and audio) and has a placeholder attribute to capture the user response. Examples of user responses include but are not limited to the text entered as a response, the attributes of a click, the co-ordinates of the drag and drop action on the MMO, the response from haptic technology on supporting devices, and touch and tactile sensors on supporting devices.

The user interacts with the video and the interaction attributes are sent to the validation server (VS). Examples of such attributes include but are not limited to the text entered as a response, the attributes of a click, the co-ordinates of the drag and drop action on the MMO, the haptic technology on supporting devices, and touch and tactile sensors on supporting devices such as but not limited to touch-screen monitors, computers, smart-phones, game consoles.

The Validation Server (VS) validates the response attributes to the challenge served for the MMO and verifies with the dataset for a possible match.

When the response satisfies with the challenge, a success message is sent to the webpage by the MMOS and statistics about the request are sent to the AS. Examples of statistics about the request include but are not limited to the timestamp, website which requested, user details when they exist, and IP address.

When the response does not fulfill the challenge posed, VS sends a failure message to the webpage and updates the SUS with the failed status.

The webpage indicates failure to the user and sends a request for a new MMO with a challenge to the MMOS, when the threshold for allowable failures is still unreached.

The process repeats from the first bulleted step hereinabove unless the number of failures threshold is reached by the website or success is met.

Figure 4:
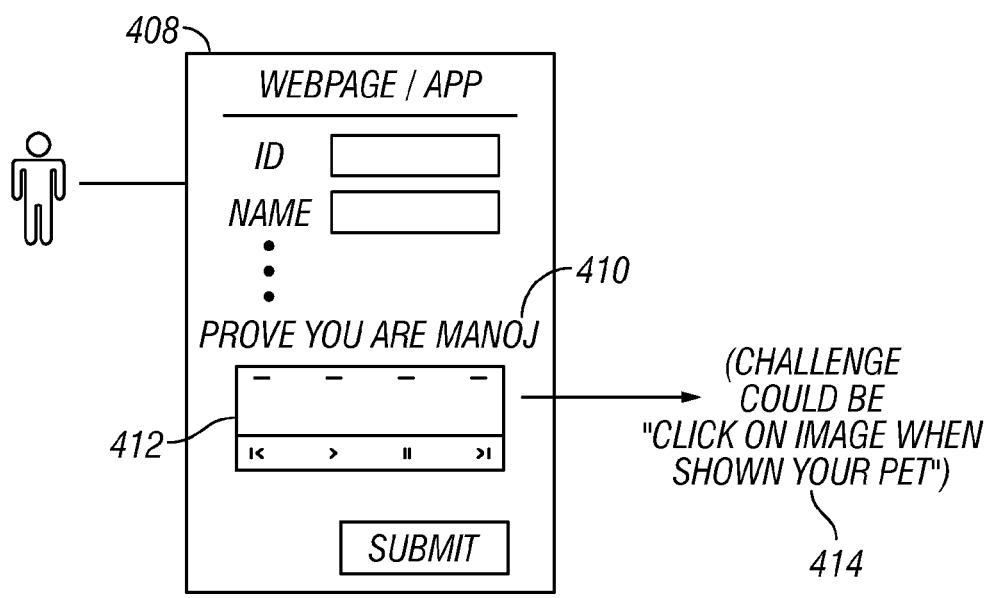
FIG. 4 is a flow diagram and an example of stitching user specified video and user defined multiple images and using the resultant multimedia as a challenge to identify the correct user, according to an embodiment.

A flow of the process of stitching user specified video and user defined multiple images and using the resultant multimedia as a challenge to identify the correct user is illustrated in FIG. 4 and an example is illustrated in FIG. 4. The system receives a video file (401), for example chosen by a user. The system splits the video into randomly sequenced pieces (402). The system takes user defined images, for example, chosen by the user (403). The system determines associated challenges and responses, e.g. type-in and clickable hotspots, for example as described in co-assigned patent application Ser. No. 13/566,690, which is incorporated herein by this reference thereto (404). The system stitches the images, e.g. pet pictures, with the video splits or pieces and creates a new video file (405). Then the system associates this new video file to a profile, e.g. a profile for the corresponding website, a profile for the corresponding user, etc., and uses this new video file as a security challenge (406). Thus, on the illustrated webpage or application 408, the goal is for the user to prove his has access to log onto the site, e.g. a statement is presented, "Prove you are Manoj" 410. Webpage or application 408 also presents a video which has been previously stitched 412. An example challenge, which is associated with the user, is shown, "Click on the image when shown your pet" 414.

Secret Questions Used to Validate a User's Identity are Classified with Certain Ad Types; Every Time the Secret Questions are Shown, Corresponding Ads are Also Shown and Used as a Challenge In an embodiment, secret questions and answers are shown to identify the user uniquely. For example, the secret questions may be "what is the model of your first car?" or "what is your pet's name?" or "which city were you born in?". An embodiment associates these questions with certain ad types. Every time there is a requirement to show these secret questions, interactive ads as MMOs from the corresponding ad type are also shown as part of the challenge. The combined challenge is used to serve the purpose of HIP mechanism and also to uniquely identify the user.

For example, a website requires a set of secret questions to be answered by a user to uniquely identify the user. As above, such questions may be "what is the model of your first car?" or "what is your pet's name?" or "which city were you born in?" In this example, the questions may be categorized as "automobile", "pets", and "travel", respectively, for the questions mentioned. Thus, every time these questions are posed, there is an interactive ad from an automotive industry or a pet industry or a travel industry shown based on the corresponding secret question shown. Solving this interactive ad along with the answer to the secret question uniquely identifies the user.

An embodiment of this invention is described hereinbelow.

1. A user goes to a website which needs to identify users uniquely. Also the website uses HIP to filter out the non-human traffic.

2. The user is required to choose answers for the secret questions asked by the website.

3. The website may have a standard set of secret questions and these questions may be categorized under certain ad types.

As in the example above, "What's the model of your first car?" may be categorized under auto, consumer ad categories; and "what's the name of your first pet?" may be categorized under pets, family. This mapping of ad categories with the secret questions may be predetermined and stored in the database/storage repository.

4. At the time of creating a user profile as in user signup or user registration, the secret questions are asked to the user to provide the valid responses. These questions are presented as a predetermined list received from the database. The user provides responses and on submission, the questions and responses are stored in the database and are associated to the user id of the user.

5. Next when the user identification is required and also when there is a requirement to filter out no-human traffic (HIP), the user is posed with the secret question. Along with the secret question, he is also posed to interact with the MMO as part of HIP requirement. MMOS checks the database for the questions for the user id. The questions returned cause the system to look up the ad categories associated with the question. An interactive ad may be fetched for the category and the user profile data for the user id, question data from the question id, and the ad data for the ad are provided by MMOS.

6. The webpage displays the interactive ad as a challenge in a HIP form (e.g. type-in, video, and audio) and has a placeholder attribute to capture the user response. Examples of user responses may include but are not limited to the text entered as a response, the attributes of a click, the co-ordinates of the drag and drop action on the MMO, the response from haptic technology on supporting devices, and touch and tactile sensors on supporting devices. This is in addition to the secret question which also reeds to be answered.

7. The user interacts with the video and the interaction attributes are sent to the validation server (VS). Examples of interaction attributes may include but are not limited to text entered as a response, the attributes of a click, the co-ordinates of the drag and drop action on the MMO, the haptic technology on supporting devices, and touch and tactile sensors on supporting devices such as but not limited to touch-screen monitors, computers, smart-phones, game consoles.

8. The Validation Server (VS) validates the response attributes to the challenge served for the MMO and verifies with the dataset for a possible match.

9. When the response satisfies the challenge, a success message is sent to the webpage by the MMOS and statistics about the request is sent to the AS. Examples of such statistics may include but are not limited to the timestamp, website which requested, user details if exists, and IP address.

8e1. When the response does not fulfill the challenge posed, VS sends a failure message to the webpage and updates the SUS with the failed status.

8e2. The webpage indicates failure to the user and sends a request for a new MMO with a challenge to the MMOS, when the threshold for allowable failures is still unreached.

8e3. The process then repeats at Step 4. Until the number of failures threshold is reached by the website or a success is met.

Figure 5:
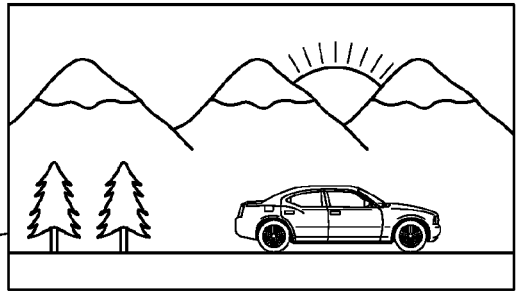
FIG. 5 is a schematic diagram of two secret questions and their respective MMO with HIP enabled, according to an embodiment.
Figure 5:
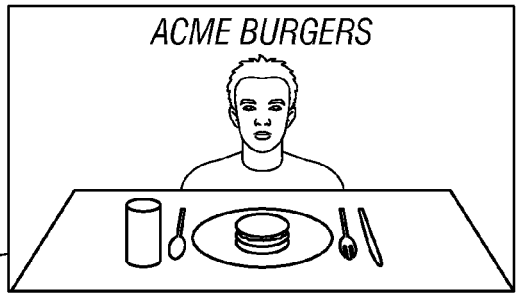

An embodiment can be understood with reference to FIG. 5, which is a schematic diagram of two sample secret questions and their respective sample MMO with HIP enabled. FIG. 5 illustrates how secret questions may be used to validate a user's identity and are classified with certain ad types. Every time the secret questions are shown, corresponding ads are also shown and used as a challenge. Regarding FIG. 5, the first secret question asks the user "What is the name of your car?" 501 and a text box in which the user can type in the name is provided 502. The user also is prompted to "click on the car in the image" 503 and an image with a car is shown 504. The second secret question is presented and says, "What is your favorite food?" 505 501 and a text box in which the user can type in the favorite food is provided 506. The user also is prompted to "type in the name of the restaurant advertised" 507 and a corresponding advertisement is shown 508 along with an input field in which the user can type in the name 509.

Multi-Phase Validation Using the Content as One or Multiple Sources and the Interaction as Another Source In an embodiment, interactive multimedia object (MMO) serves hip features and a valid response may be a combination of response from the image itself and response dependent on the content where such MMO is being served. As such, this is a multi-phase validation using the content as one or multiple sources and the interaction as another source.

In an embodiment, websites use MMO ads for HIP. In this embodiment, the challenge posed by this type of MMO is split and the response is a combination derived from interacting with the image and also from the content being served.

For example, a user may be challenged by a soda MMO ad which asks the user to type-in the brand name in the ad along with the publishing date or author of the content where the MMO ad is being served.

An embodiment is described as follows.

A user visits a website which uses MMO ads for HIP.

The webpage calls the multi-media object server (MMOS) to fetch a multi-media object (e.g. an image, video or audio) with additional attributes sent to MMOS such as website details, user demographic details, behavioral pattern of user, etc., when available.

MMOS parses the details sent by the publisher's webpage and fetches a relevant MMO which fits the requirements sent in by the webpage. The data to match and serve is stored in the database on the server. MMOS creates a session id for the request.

Along with the image and html content sent to serve the image on the client, a client side script to be executed on the client such as a browser or app, is also sent. The client side script may be in any of the known client side scripting languages such as javascript, jquery, and actionscript.

The script may parse the webpage's Document Object Model (DOM), which is a cross-platform and language-independent convention for representing and interacting with objects in HTML, XHTML, and XML documents. Objects in the DOM tree may be addressed and manipulated by using methods on the objects. The script then extracts the html content of the page. The content may be stored in the web storage of the browser as session storage. For example, Web storage and DOM storage are web application software methods and protocols used for storing data in a web browser.

The script may have randomizer logic to pick random words from the content of the page and the associated position in the document such as third word in the first paragraph or first word in the title of the document. The word along with the position in the document may be sent to MMOS along with the session id. The script creates part of the challenge in the form of "tap or type in the third word in the first paragraph" and displays such along with the MMO rendered on the webpage or app.

Part of the challenge may be interacting with the image/MMO and the other part may be from the content or rest of the webpage which may be dynamic in nature and which may be formed by the script as explained in the previous step.

The user interacts with the MMO and the interaction attributes are sent to a Validation Server (VS) as response attributes. Examples of such interaction attributes include but are not limited to the text entered as a response, the attributes of a click, the co-ordinates of the drag and drop action on the MMO, the haptic technology on supporting devices, and touch and tactile sensors on supported devices such as but not limited to touch-screen monitors, computers, smart-phones, and game consoles.

The Validation Server (VS) validates the response attributes to the challenge served for the MMO and verifies with a dataset for a possible match. It should be appreciated that this step may be only with respect to the partial challenge which is relevant to the MMO and not with the challenge from the webpage/content.

When the attributes of the response satisfy the challenge, a success message is sent to the webpage and the response pertaining to the webpage/content is sent back to the publisher.

The publisher may validate the partial response related to the webpage/content and also check the success/failure from the MMO interaction sent by VS.

When both responses to both challenges are successful, the validation is complete with success as the result.

When the MMO interaction response does not satisfy the challenge posed, VS sends a failure message to the webpage and updates the SUS with the failed stats. Such failure message may indicate the publisher to ignore the response related to content/website and consider the whole validation as failure. Similarly multiple phases of validation from the website may be used in combination with the MMO interactivity to treat the whole validation process as a complete unit.

Figure 6:
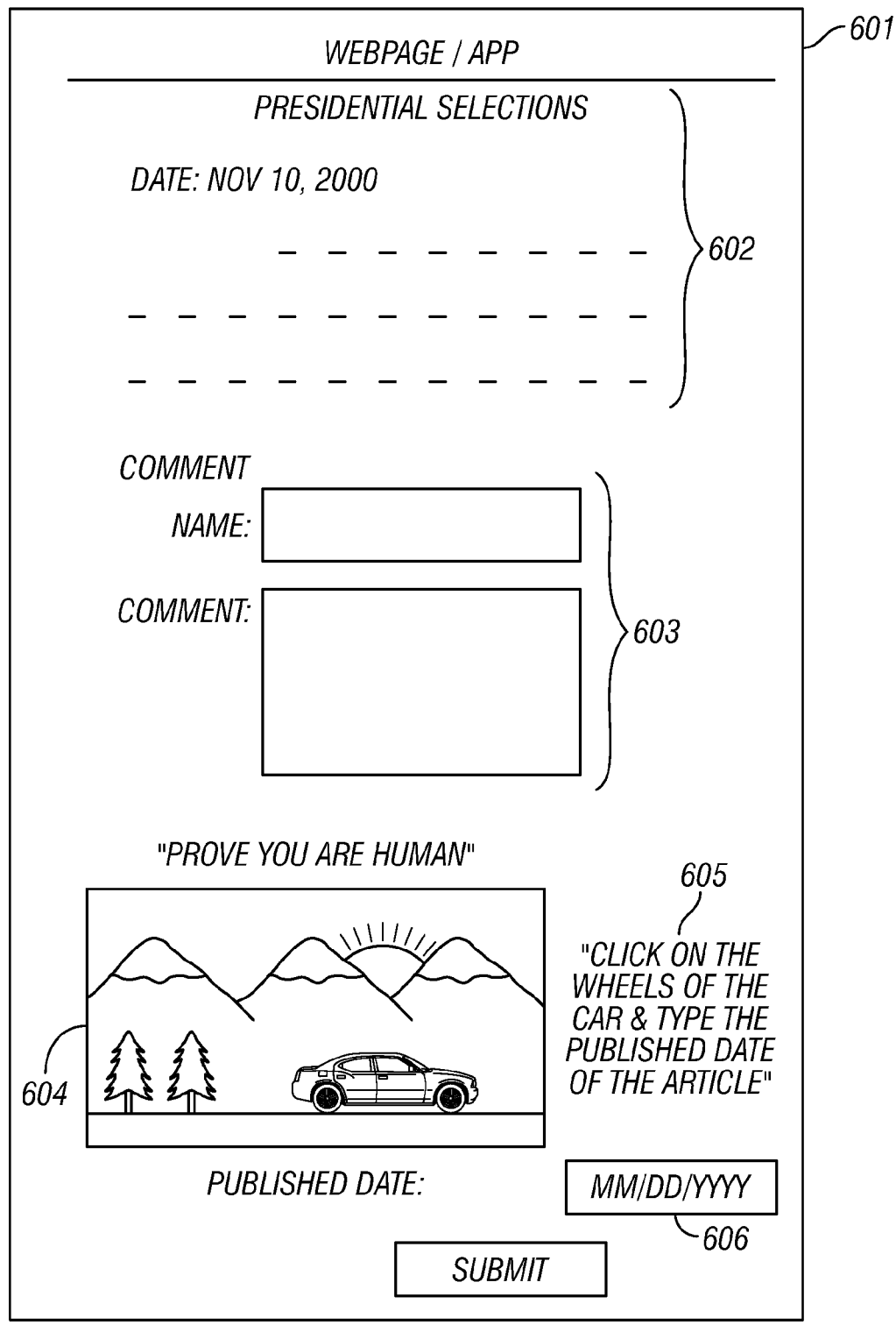
FIG. 6 is a sample webpage or application demonstrating interactive multimedia (MM)) serving HIP features, in which the valid response for this is a combination from the image and response dependent on the content where the MMO is being served, according to an embodiment.

An embodiment can be understood with reference to FIG. 6, a sample webpage or application demonstrating interactive multimedia (MM)) serving HIP features, in which the valid response for this is a combination from the image and response dependent on the content where the MMO is being served. Such example shows a multi-phase validation using the content as one or multiple sources and the interaction as another source. A webpage or application 601 contains an article about presidential selections 602 and a place where a user may leave a comment about the article 603. The user is presented with an interactive MMO 604 with accompanying instructions, "Click on the wheels of the car and type the published date of the article" 605. A GUI element is presented for which the user to enter the published date 606. It should be appreciated that the correct date is Nov. 10, 2000, which a bot would most likely not be able to detect.

Use of Web Mapping Technology to Act as an Interactive MMO that Helps Identify the User as Well as Serve the Purpose of HIP In, an embodiment, web mapping software may be used widely by users and the usage may be becoming more prevalent with smart devices. It should be appreciated that embodiments herein contemplate using any web mapping software as is well known by people with ordinary skills in the art. Such web mapping technology may include the user tagging with information useful to the user and may be used as a security mechanism to uniquely identify the user as well as use it for HIP.

For example, a website might ask the user to identify details such as: the city where the user was born; the place where he grew up; the location of school; where does he generally stop to fill up gas when commuting from work to home, point out the location of the favorite restaurant when he was a kid; the location of the dealer where he purchased his current/first car, and so on.

An embodiment of this invention is described below.

A user goes to a website which needs to identify users uniquely. The website uses HIP to filter out the non-human traffic and the website has geographical information about the user.

Web mapping software is used to ask the user to identify/tag important information on the map which only the user may be able to identify self.

The website uses this information to help identify the user uniquely.

The validation process may be the same as the validation process explained in the earlier cases and the process of validation as illustrated in FIG. 1.

Figure 7:
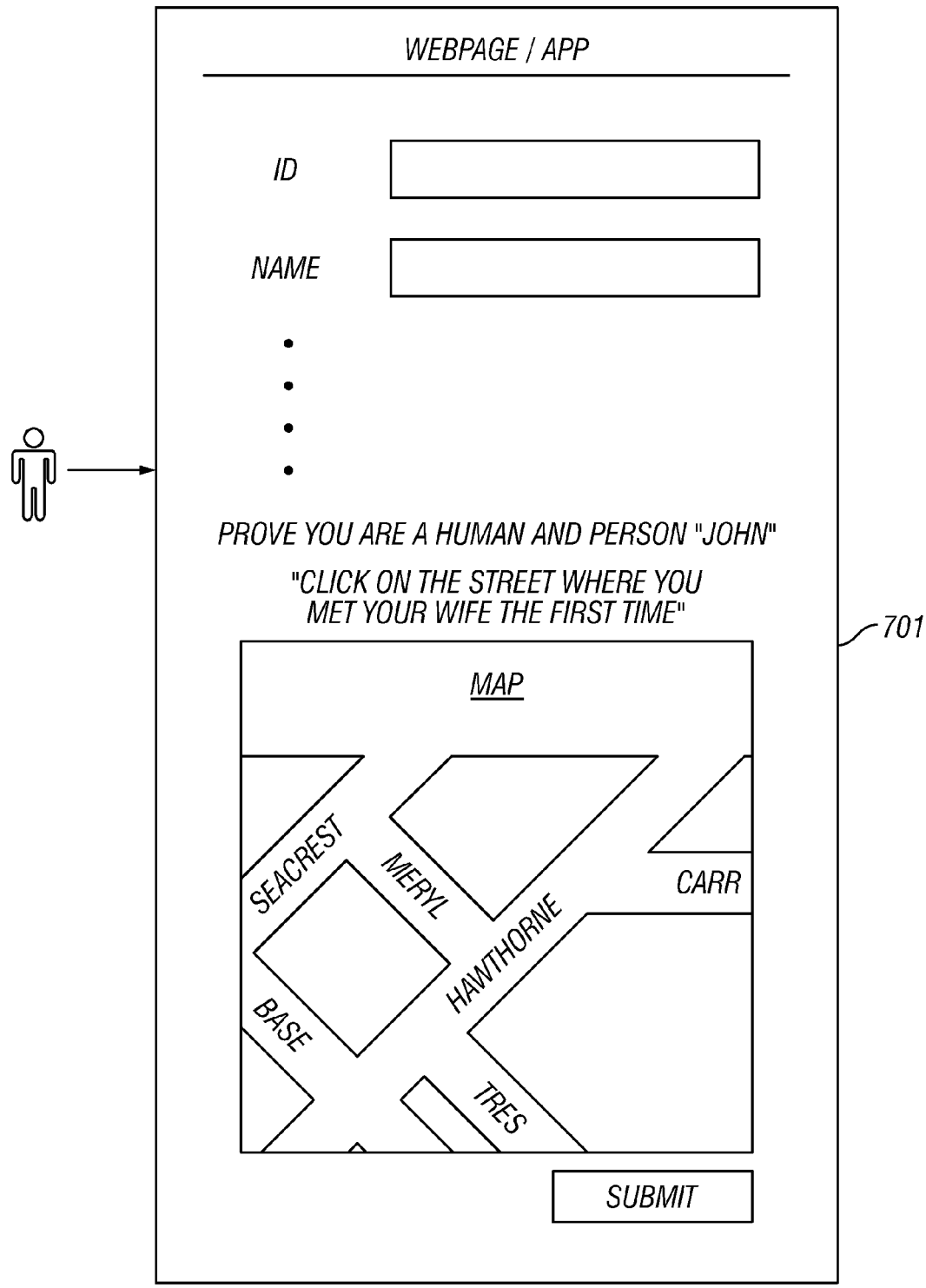
FIG. 7 is a schematic diagram of a webpage or application that uses web mapping technology to act as an interactive MMO that helps identify the user as well as serve the purpose of HIP, according to an embodiment.

An embodiment can be understood with reference to FIG. 7, a schematic diagram of a webpage or application 701 that uses web mapping technology to act as an interactive MMO that helps identify the user as well as serve the purpose of HIP. In this example, the user is instructed to click on the street where he met his wife the first time.

Figure 7A:
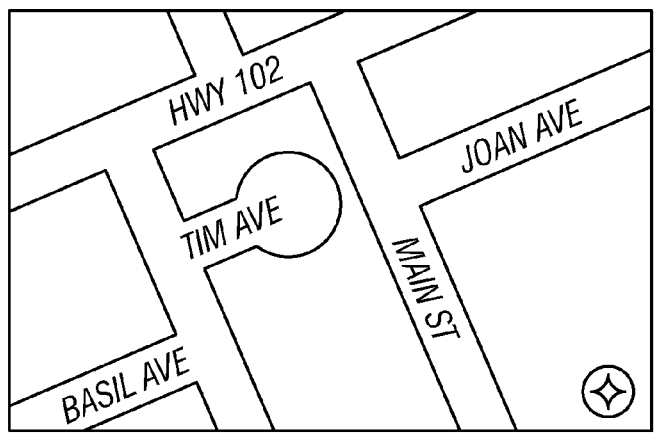
FIG. 7A is a schematic diagram of a registration webpage or application that uses web mapping technology to act as an interactive MMO that helps identify the user as well as serve the purpose of HIP, according to an embodiment.
Figure 7A:
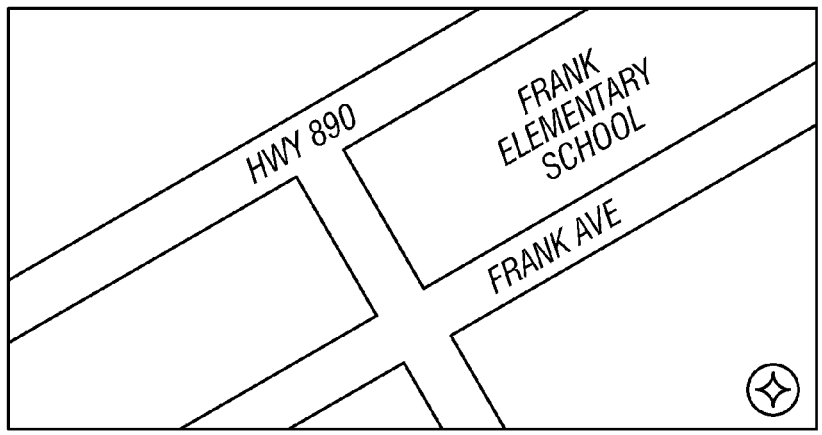

An embodiment can be understood with reference to FIG. 7A, also is a schematic diagram of a registration webpage or application that uses web mapping technology to act as an interactive MMO that helps identify the user as well as serve the purpose of HIP. Two secret questions are asked of the user and the user responds each time by tapping on the street in interactive map at the correct location.

For example, a website requires a set of secret questions to be answered by a user to uniquely identify the user. Examples of such questions may include but are not limited to "Click/tap on the map where you met your spouse" or "Tap on the street where you attended your kindergarten." In these examples maps are shown at the time of user profile creation which may be at the time of user signup or registration. The coordinates identified by the user may be stored in the database. Solving this interactive ad along with the answer to the secret question uniquely identifies the user. An exemplary flow in capturing and associating the data to a user id is as follows:

Step 1) In a user signup/registration form, user profile details such as UserID, password, address, etc., are requested. As well a map interface is presented to create secret questions and answers. Session information from the page is sent to MMOS to provide a unique id for the user.

Step 2) Maps are shown on the client side along with the predetermined secret questions and illustrated in FIG. 7a. The questions are from the database on the server side and are sent to the client by MMOS, for that session id.

Step 3) The user inputs his profile and marks or taps on the map to mark the co-ordinates which tie to the valid response for the secret question. The latitude, longitude co-ordinates returned from the map api be recorded by the client. The map api may be any industry standard api such as but not limited to mapquest api or google maps api. The co-ordinates of the nearest intersection streets from the latitude and longitude co-ordinates are recorded on the client side. These co-ordinates and the user profile details are sent from the client webpage to MMOS, along with the session id and user id for that session. Another variation of the map co-ordinates are to obtain the latitude and longitude of the co-ordinates of the tap/click/address mentioned and then specify a polygonal area in which the co-ordinates are circumscribed. The polygonal co-ordinates may be stored in the database.

Step 4) The details are stored in the database and the co-ordinates are associated to the question and the user id. This information may be used to validate the user as part of the secret question validation.

Similarly, when needed to be used as a HIP proof, the specified co-ordinates may be specifically asked by the secret question as "Tap on the main street in the map to prove that you are a human and not a bot". The question and valid answer may be stored in the database and the validation of response is as illustrated in FIG. 1.

Methods to Create a Scalable Challenge for a Media to Provide Hip Support

Multimedia objects (MMOs) can be misused in various ways. Humans or bots can interact with the MMOs to earn revenue and misuse online services. Multimedia objects can be directed to third parties to interact with the media objects for resolving human proof challenges.

Embodiments herein provide various methods to handle such misuses. One significant issue in designing such methods is to make the challenge scalable such that bots find it difficult to predict and recognize. However, to increase media interaction and media engagement, it also may be necessary to form a relationship of challenges with the media objects. It is desirable that either of these actions be done while keeping an easy usability.

In one or more embodiment, various interaction techniques may be used to form such challenges, which may be text based or non-text based.

For text based challenge creation, when metadata of the media is available, the techniques used in accordance with embodiments herein use backend support such as search engines, own devised web crawlers, own database, old media archives, etc., to find relevant information to create challenge questions. For example, when the metadata of the media is "ABC Corp", the system may find relevant ad slogans of "ABC Corp" from the Internet and create a challenge for users to input that slogan. The text may be presented in the form of HIP enabled images to make sure that bots find it difficult to recognize.

For text based challenge creation, when only limited metadata is available, the limited data are processed to bring out more sensible keywords to be used as meaningful metadata. Embodiments herein process limited or indirect metadata to a more meaningful metadata. The extracted information are then fed to the system's backend engine to find relevant information which may then be used to form challenge sets. For example, the limited metadata for a media may only be a media redirect web link. The web link may contain several ids which may not make any direct sense to filter information. However, the system's engine makes recommendations and ranks usable words appropriately based on high hit ratio and other ranking methodologies within temporal and spatial boundaries. One or more embodiments base the challenge question on the information retrieved. The data for text based challenges may be obtained from any search based api and the procedure may be similar to what is in the section "Use of web mapping technology to act as an interactive MMO that helps identify the user as well as serve the purpose of HIP." In an embodiment, instead of the map api, search api may be used.

For text based challenge creation, when no metadata is available, an embodiment may also provide a method to perform image search of the media to find other similar media and its associated metadata. Those metadata are then processed to build challenge questions and are tagged with the media. This allows close association between media and the challenge question.

For non-text based challenge creation, when metadata is available, one or more embodiments may suggest using image object search with the metadata. The metadata based information retrieval system uses intelligent machine learning based system to filter information which may then be used to form challenge and response pairs for the media.

For non-text based challenge creation, when no metadata is available, one or more embodiments may suggest to use image search of the media to find relevant image to be used as a challenge. The response may also be framed using that information.

Figure 8:
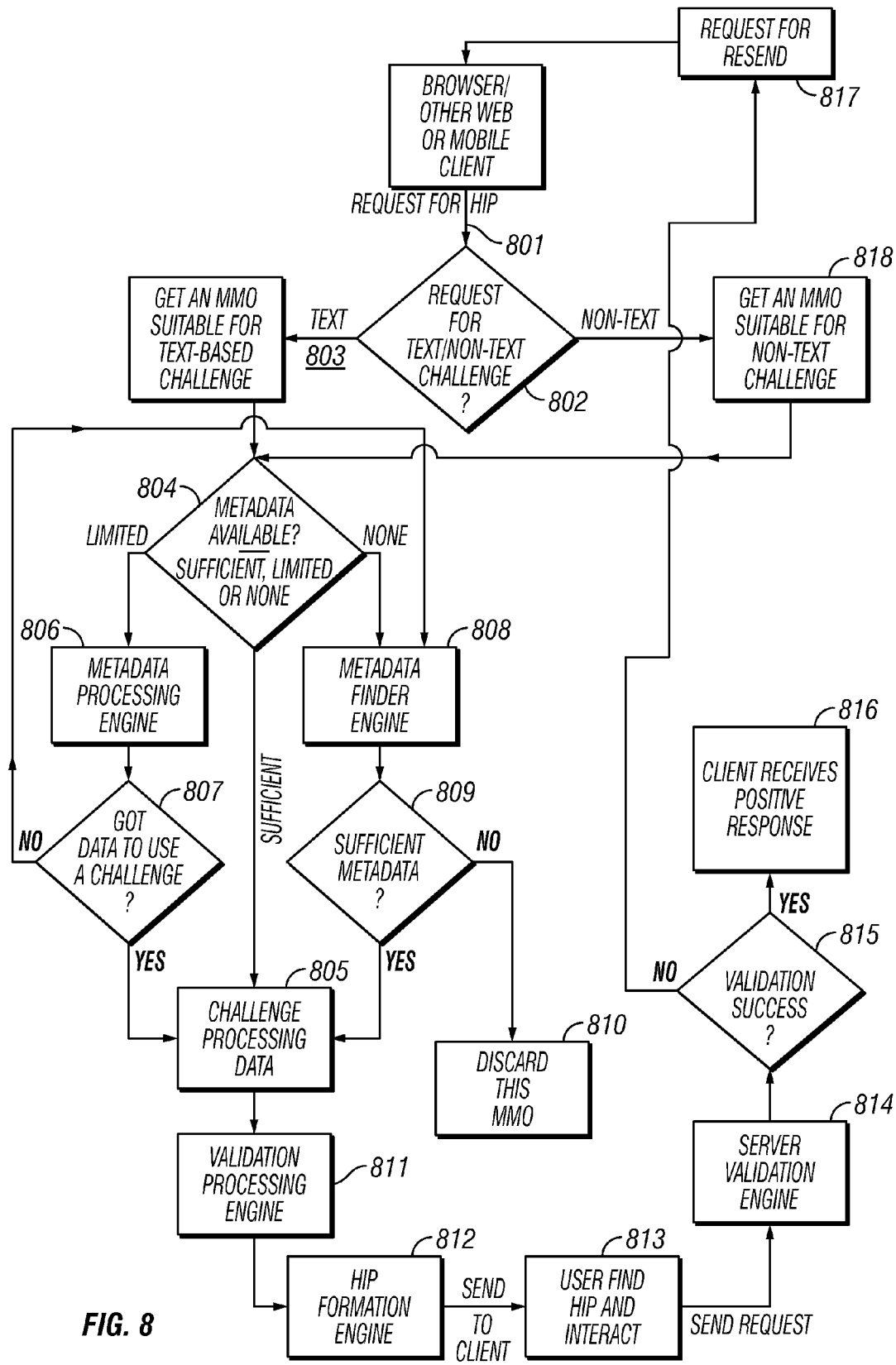
FIG. 8 is a flow diagram of creating challenges that can scale for a media with HIP support, according to an embodiment.

An embodiment for creating challenges that can scale for a media with HIP support can be understood with reference to FIG. 8, a flow diagram of such process. A browser or web or mobile client ("browser") sends a request for an MMO and challenge (HIP) (801). It is determined whether the request is for a text based challenge or a non-text based challenge (802). When the request is for a text based challenge, the system gets an MMO suitable for a text based challenge (803). Then the system determines whether the metadata available is sufficient, limited, or none (804). When the metadata available is sufficient, control goes to challenge processing data (805). When the metadata available is limited, the system goes to a metadata processing engine (806) and asks whether it has data to use as a challenge (807) and, if no, goes to a metadata finder engine (808) and if yes, goes to challenge processing data (805). When the metadata available is none, the system goes to said metadata finder engine (808). The metadata finder engine determines whether there is sufficient metadata (809) and when yes goes to processes challenge data (805) and when no, discards the MMO (810). After challenge processing data, the system goes to validation processing engine (811) and subsequently to an HIP formation engine (812) and sends said MMO with said HIP to a client, where the user finds the HIP and interacts therewith (813). After interaction with the HIP at the client, a response or request is sent to VS (814) and it is determined whether said response is valid (815) and when yes, said client receives a positive response (816) and when no, make a request to said browser to resend request for HIP (817). When said request is for a non-text based challenge, the system gets an MMO suitable for a non-text challenge (818) and goes to the step determining whether the metadata available is sufficient, limited, or none (804).

Methods to Create Hybrid Challenges and Response System to Increase the Efficiency of HIP In an embodiment, for image or multimedia based challenge creation, a hybrid challenge model is provided and may be used to increase the uncertainty in the challenge. In the embodiment, multiple layers of interactions may be added independently, each layer acting as a challenge to the user. Multiple types of challenges can be accompanied together and can be processed independently of each other or can be combined with each other as well. For example, a type-in challenge model layer can be integrated with an additional and independent click based challenge model around the type-in. Such embodiment makes the overall system very scalable and secure.

It should be appreciated that the system's capability for creating such challenges may also be scaled properly because such creations can be done independently. In an embodiment, multiple servers can be involved in creating and caching multiple types of challenges and some of such challenges may be randomly picked to pose as an overall challenge to an end user. Such systems and type of challenge creation systems can be scaled by increasing the number of servers and running specialized thread or processes on different servers.

Figure 9:
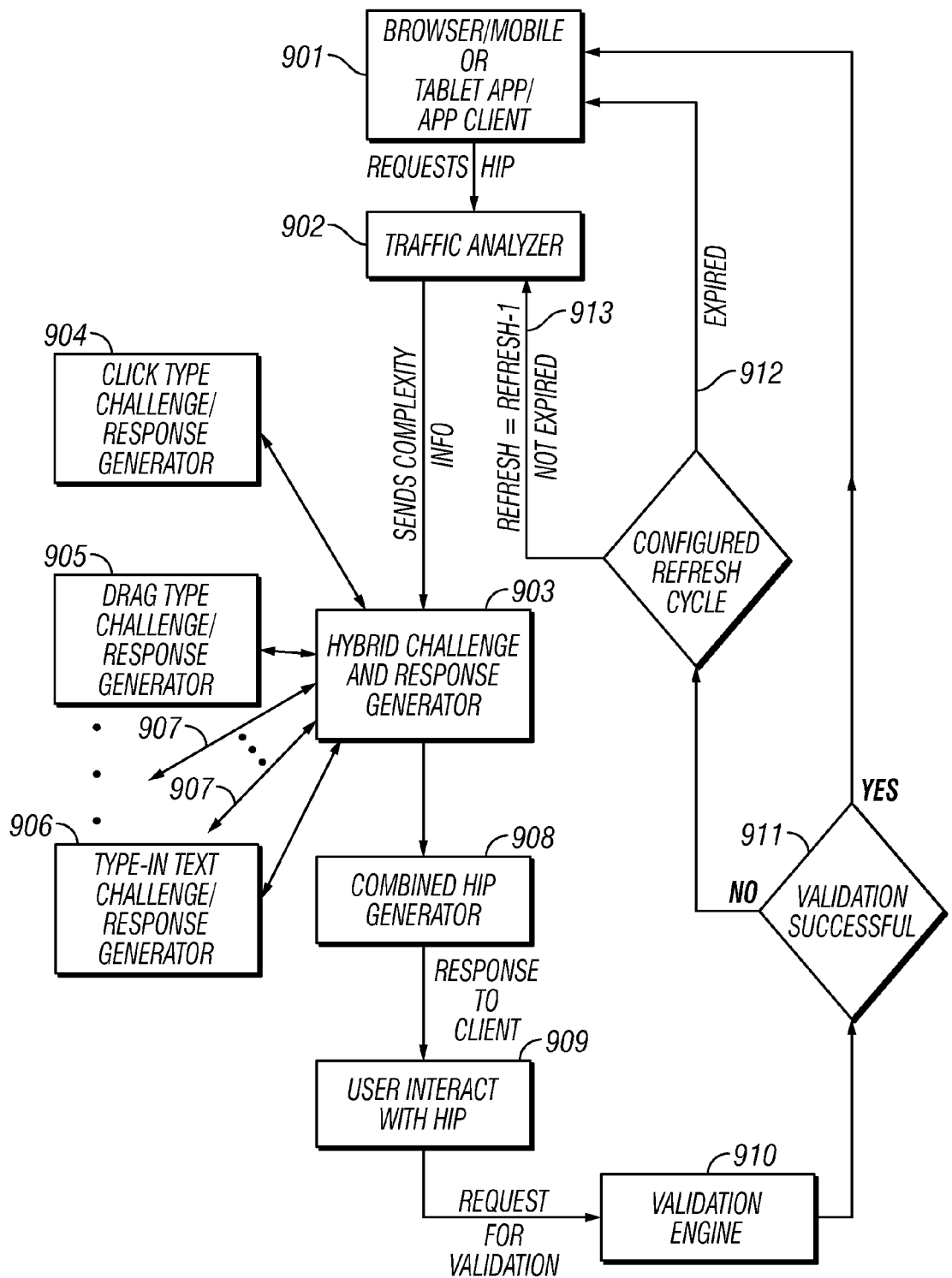
FIG. 9 is a flow diagram of a method for creating hybrid challenges and responses, according to an embodiment.

An embodiment can be understood with reference to FIG. 9, a flow diagram of a method for creating hybrid challenges and responses. A website or application (browser) requests HIP (901) from a traffic analyzer (902), which is configured to send complexity information about the HIP to a hybrid challenge and response generator (903). The hybrid challenge and response generator obtains two or more HIPs from any of a click type challenge and response generator (904), a drag type challenge and response generator (905), a type-in text challenge and response generator (906), and other types of generators (907). A combined HIP generator combines said two or more HIPs (908) and the combined HIPs are served to a client. A user interacts with the HIP (909). After the combined HIPs are interacted with, a request for validation is sent to said VS (910). It is determined whether the validation is successful or not (911). If yes, a success message is sent to said webpage or application (901) and when said validation is a failure, a failure message is sent to said webpage or application when a refresh threshold is expired (912), otherwise a request for HIP again is sent to the traffic analyzer and increment a refresh counter that is used to determine when the refresh threshold expires (913).

Figure 9A:
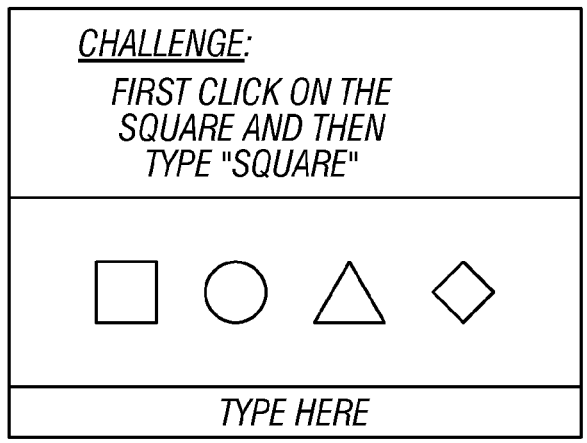
FIG. 9A is a schematic diagram of examples that demonstrate hybrid challenge and response based HIP, according to an embodiment.
Figure 9A:
Figure 9A:
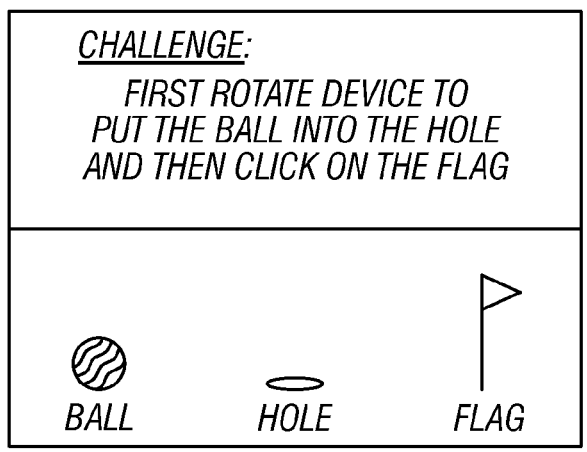

FIG. 9A shows some examples that demonstrate hybrid challenge and response based HIP.

Methods to Measure Engagement on Hip Media

One or more embodiments define and provide different metrics to measure engagement on HIP media. Examples of such metrics are listed below. It should be appreciated that such list is exemplary and not exhaustive and that one skilled in the art may conceive of other metrics and still being within the scope of the invention.

Interaction details. For example, clicks, drags, etc.
Redirection details. For example, any redirected links that were hit.
Interaction validation—success or failure.
Additional interaction—measurement of interaction such as copy of particular things in the image, getting coupons, clicking coupons, providing leads, etc.
Cookies enabled metrics—Using cookies to monitor and measure media engagement effectiveness.
Time spent—how much time is spent on the HIP media engagement
Statistical data—Collaborative analysis of engagement on a specific media from different engagements.
Demographic analysis—how certain demography can engage in one media differently than others.
Interest metric—The system may be configured to provide an interface to show the user expression and to measure such expressions across demography.
Social metrics—The system may be configured to provide social sharing for the HIP media and to include social metrics in the engagement.

Methods to Provide Multiple Known Images with Some Unknown Images Acting as Noise An embodiment provides a component configured to provide noise in HIP which can be tied together with valid objects to confuse bots. In the embodiment, the system creates a challenge by including various known images such as a book, tiger, plate, and spoon with some unknown images, which can be randomly picked. Such unknown images may be randomly picked by mixing certain textures of the known images or from any third party source. Such unknown images may bring enough noise and create more hurdles for bots to detect the correct image from all the presented images.

Figure 10:
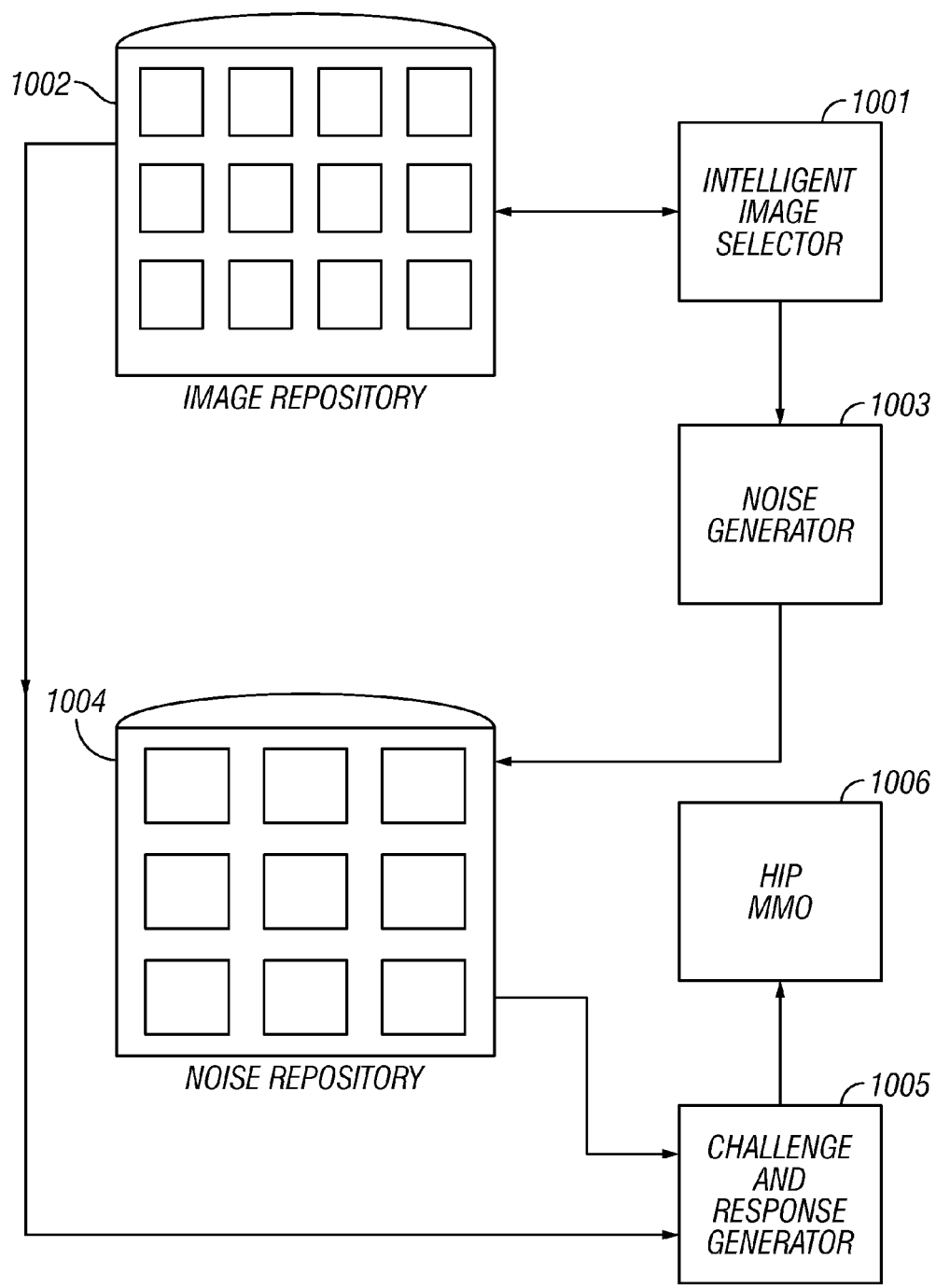
FIG. 10 is a schematic diagram of noise elements being added to increase the difficulty for bots to identify the valid objects, according to an embodiment.

An embodiment can be understood with reference to FIG. 10, a schematic diagram of noise elements being added to increase the difficulty for bots to identify the valid objects. Known and unknown images may be mixed to create noise in HIP. Such technique adds an extra level of difficulty for bots to find valid objects. However, the system keeps it simple enough for a human. Known and unknown images are determined by an intelligent image selector 1001 recognizing and storing known images in an image repository 1002. Intelligent image selector 1001 executes a noise generator 1003 to generate unknown images having or being noise and stores the unknown images in a noise repository 1004. A challenge and response generator 1005 combines images from image repository 1002 and noise repository 1004 to create the MMO and challenge (HIP) comprising known images and unknown images 1006.

Methods to Translate Languages Using HIP Media

In an embodiment, a challenge is asked to an end user and the response may be a translated version of the challenge or may be some closely related text. A response may be given by providing a translated text.

In an embodiment, the system may be configured to provide an option by which the user is not forced to translate and, instead, goes to or chooses another type of response and challenge mechanism.

It should be appreciated that this kind of challenge and response system also creates more problems and makes it more difficult for the human farm, a group of people who manually solve captchas and are involved in breaking captchas.

It should be appreciated that an embodiment may provide a utility to society by translating languages. In this embodiment, image labeling may be done and confirmed using translated text. For example, a challenge asked against an image may be to write the three most important things noticed in the picture in a local language. In the embodiment, the response and related code may try to translate internally the local languages and match with other responses of other languages which are stored in the system. When the there is a match, the response may be considered valid.

In other embodiments, writing translated local keywords for an image may be augmented by other challenges to ensure that the responded answers are valid. As well, more statistical approaches may be taken to confirm the translated text. For example, a same image can be shown to multiple people and when the responses show, via computed statistical analysis, a positive pattern for the valid answer, subsequently, the image may be labeled with keywords, from the multiple responses, with higher probability of corrections.

Methods to Provide Support for in-Premise and House-Media to Publishers/Advertisers/Media Platforms In accordance with an embodiment, the system may be configured to provide flexibility and control to use house-media such as for example ads for the products owned by the company, ads for the services of the company, ads for the products of partners, etc. Such house-media may be ads or any other branding or promotional marketing campaign objects.

In an embodiment, such house-media may be used as HIP media. Challenges and responses may be associated by using any of the techniques mentioned herein. This embodiment enables enterprises such as but not limited to banks, corporate websites, etc. to brand their own product and services while providing value added spam protection services.

The system or components thereof may also be housed in the premise of the company or any entity that likes to use house-media. This capability provides the company or entity more flexibility and control in using HIP media.

Enhanced Authentication Agent

In an embodiment, the system is configured to provide ways to increase the secured authentication process. In some of the prior art systems, companies ask users to select an image and some random text for their account. The companies ask users to provide a password only when they see their selected image and text every time they login. They alert users not to provide the password if they don't see the image which they selected for their account. This helps companies to fight phishing issues.

One or more embodiment provides other capabilities to provide an extra level of authentication protection. For example, the system may be configured to ask the user to select some challenges and responses for an image which he or she sees in his or her personal account. In this case, users do not just see the image but act on it based on the challenge asked. In this embodiment, all the challenges and response interactions are chosen by the user, such that only the user himself is able to make the correct response. For example, an user can upload an image of their childhood birthday party. The user can create challenges such as "Who is my best friend?", "Where is my mom?", etc. The response may be tagged to that image by various interactions such as text input, click, drawing, etc.

In an embodiment, users may upload multiple images and sets of challenges and responses to each image to personalize and make their account more secured.

This system helps the companies to validate the user interaction apart from the login and password. Because these interactions and challenges are very easy and personalized in nature, these features may increase the authentication security to a higher level with a very minimal user impact and cost. With this process not only are companies able to prove themselves as genuine to the users, users may also perform or take extra actions to prove their authenticity.

It should be appreciated that this embodiment of enhanced authentication agent may be very effective for the small screen and touch devices because interactions are very easy.

In an embodiment, the system is configured such that such required interactions also may be sent to other devices which are capable of making interactions.

Methods to Provide Flexibility to Pick Media Source

In an embodiment, a component of the system allows flexibility to the user to pick the media source which can be converted to HIP media by the processing done in another component of the system. For example, a particular image directory path is input to the system which enables the system to know from where the images can be picked and used as a HIP media.

In an embodiment, such images may be split into pieces, e.g. five, programmatically and stored the correct order into the system as a response. A challenge may be created for the user to arrange the split picture pieces into an order which is more meaningful and complete. Any response is matched with the stored order and if it matches, the system validates the response.

Similarly with text ads or other texts found in search engines and other web sites, in an embodiment the system is configured to use the similar text ads and convert them into HIP. For example, some portion of the text may be converted into handwritten style by adding some noise. Such types of conversion of the text may be used as a challenge part in HIP.

Methods to Provide HIP Support to Smart Tv

It has been found that current HIP technologies may be very difficult to deal with when HIPs are presented to other smart devices such as a smart television (TV). In an embodiment, the system is configured to sense or detect and determine various interactions done in a smart TV and to understand such interactions as a response. For example, a few patterns of remote control actions may be understood as a response. In an embodiment, the system may be configured to detect if the device is a smart TV and, accordingly, pose a challenge which can be easily responded by a TV user.

This embodiment is important to secure the attacks from malicious bots such as the bots which can fake as a TV device and attack the content or record the videos from the TV when it is streamed automatically from web devices.

Template Based HIP

In an embodiment, a method allows to create several templates having several fixed parts but with some empty spaces. These spaces may be used for creation of random challenges. The empty spaces may also be randomized within the template. Such templates may be any multimedia such as images, animation, or interactive games.

In an embodiment, the templates consist of a structure which is very basic in nature. Such type of template may be considered a skeleton. Subsequently, different modules, which are part of this template, may be defined. Also subsequently, a relationship may be built between modules to propose challenge and response mechanisms. Such template-based HIP provides a very scalable and uniform way of presenting HIP.

As well, the system is configured to provide capabilities to find and fill the templates automatically given the set of categorized multimedia objects. The system uses intelligent classification and aggregation algorithms to populate and build relationships within the template elements. Based on the template elements, the system may also pick the most suitable relationships to be defined as a challenge in the HIP.

In an embodiment, the response may also be defined using either static mapping of relationships to the interactions or the response may be picked dynamically at run time. As well, a challenge may be associated with multiple types of responses and vice-versa.

For example, a pattern matching template system generates challenges based on the pattern matching system. For example, there may be one multimedia source which has a typical pattern and the challenge images may then be created that match closely with that pattern. However, it should be appreciated that an embodiment makes it difficult for current pattern matching algorithms to do reverse matching but make it easy for humans to solve the challenge.

Figure 11:
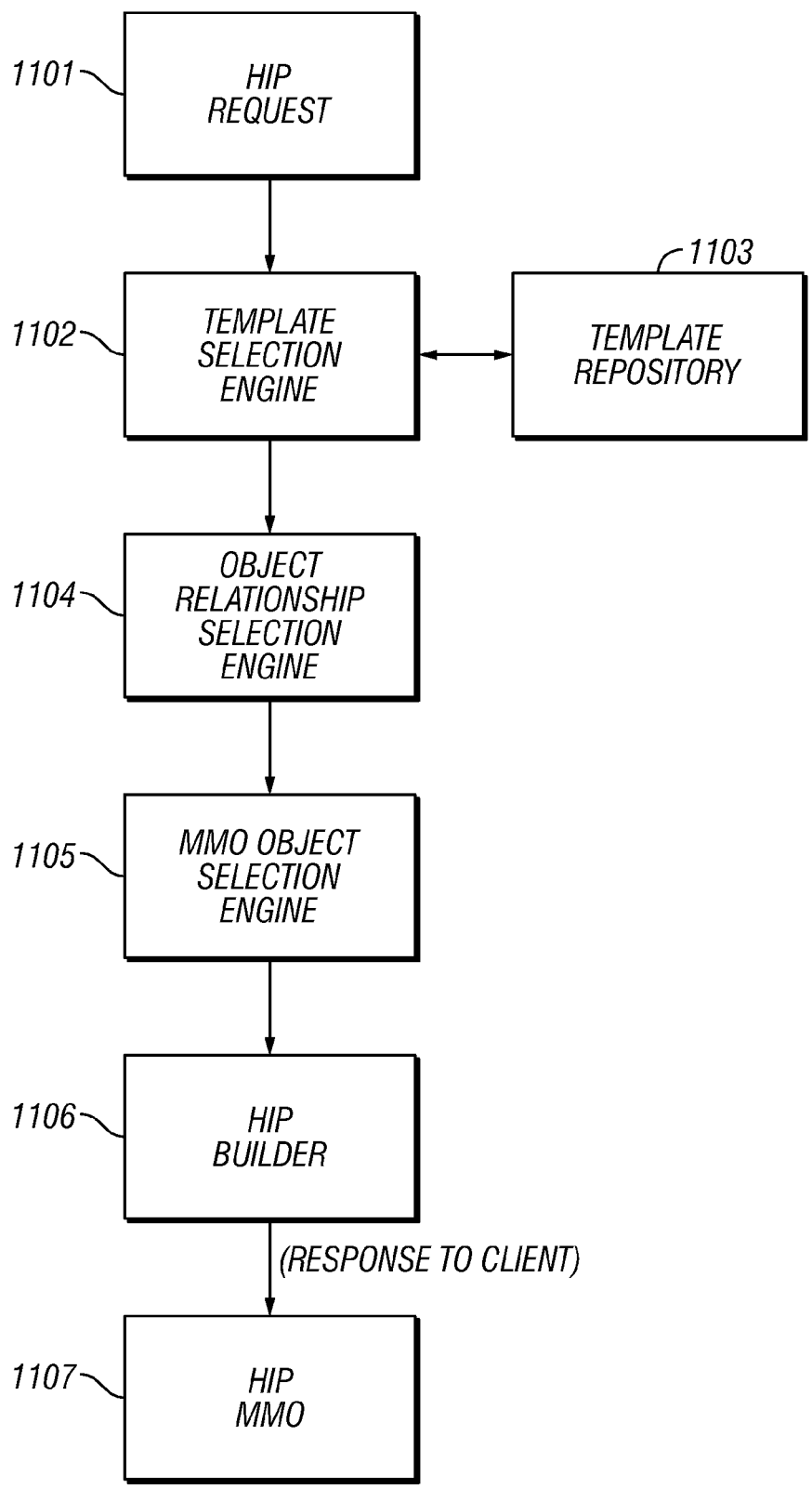
FIG. 11 is a flow diagram of creating a template based HIP, according to an embodiment.

An embodiment can be understood with reference to FIG. 11, a flow diagram of creating a template based HIP. An HIP request 1101 is made to a template selection engine 1102. Template selection engine 1102 obtains a template from a template repository 1103. Template selection engine 1102 sends the template to an object relationship selection engine 1104. Object relationship engine uses intelligent classification and aggregation algorithms to populate and build relationships within elements of said template and based on said elements, picks most suitable relationships to be defined as a challenge in the HIP. Based on that information, an MMO object selection engine 1105 selects an MMO object. An HIP builder 1106 combines the MMO object and the defined challenge and sends the combined MMO object with the defined challenge to a client 1107.

Figure 12:
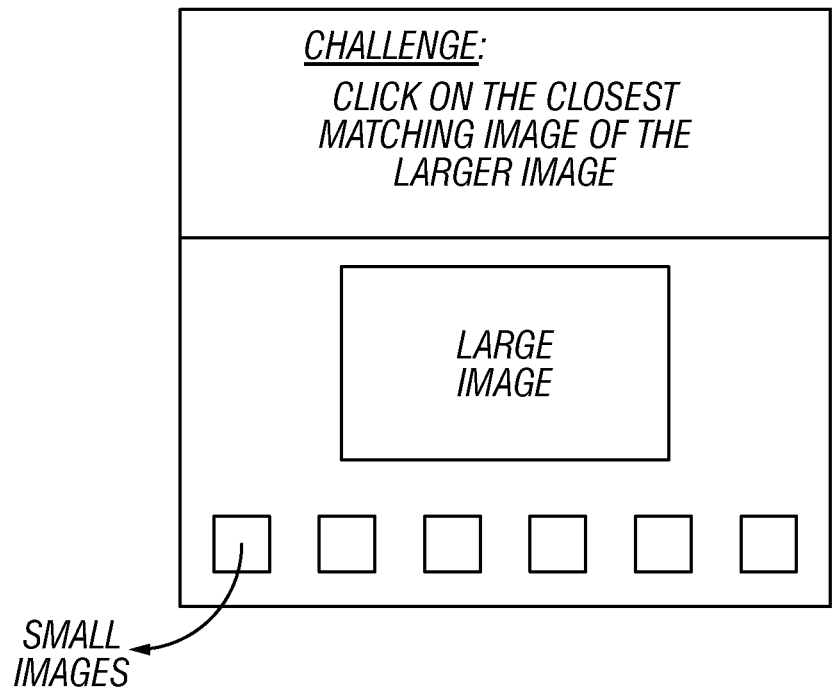
FIG. 12 is a schematic diagram of an example challenge to demonstrate the template based HIP and examples of relationships, objects, interactions, and templates, according to an embodiment.

An embodiment can be understood with reference to FIG. 12, an example challenge to demonstrate the template based HIP and examples of relationships, objects, interactions, and templates. FIG. 12 shows an example of a template based HIP where the template is source and target containers. Objects, relationship between objects, and interaction are also defined to complete the template based HIP. Templates, relationships, objects, and types of interactions are encompassed as one set and a different combination of different or the same templates, relationships, objects, and types of interactions are encompassed as a different set and two or more different combinations of the sets may be used to create different HIPs.

It should be appreciated that different e-commerce websites are willing to provide a pattern based search of the products. For example, such websites enable a user to take a picture of a product and then search for the product in the database of the website. In these types of databases, categorization is a problem. Categorizations and classifications may be improved using embodiments herein. For example, in an embodiment, the system provides HIP methods that may be employed to ask the user to correctly match patterns. Some of the patterns may be used as a dummy for categorization while others may be used for security. As well, in an embodiment, statistical analysis for some set of population may be used to find which pattern matches closely to the ones being asked in the challenge.

It has been found that there are various places where HIP multimedia becomes very important to provide good level of authentication and security. For example, in an embodiment, the system is configured to provide integration with the tools and techniques that are associated with those user flows. For example, downloads require HIP protection. There are several download managers which are out in the market and the system herein is capable of being configured to integrate with such tools.

One good example are comment boxes. Comment boxes are tools by which users leave some comment or collaborate on others' comments. Users can interact with the previous comments such as vote, like, dislike, score. Such interactions are prone to bot attacks. Such tools may be integrated with the HIP enabled MMOs. In an embodiment, the MMOs also may be attached without HIP enablement in some places to increase the effectiveness of MMOs.

Human Computation Methods Using Our System

In an embodiment, human computations may be used to help systems to learn and create better training data for the machine learning algorithms. For example, in an embodiment, a couple of questions may be asked to a user—one for human verification and the other for unsolved or complex pattern matching. An embodiment provides such questions such that the user may be caused to or is encouraged to try to answer both correctly. Such technique enables the system to learn and optimize indexing of close matching images.

In an embodiment, the system is configured to help resolve outliers which are not being solved by the current computer vision techniques. The system is configured to use human intervention to improve image pattern searching.

In an embodiment, the system is configured to improve multimedia classification. For example, the system may provide two multimedia objects such as images and create a challenge by asking a user to interact with the common objects in the images. In the example, the system may present one image with many objects, e.g. sun, mountain, trees, fruits, and a girl, and a second image that contains a fruit. The challenge for the user may be to encircle the object in the first image which belongs to the same class/family/category of the object being shown in the second image. It has been found that this challenge is a difficult problem for machines to solve. There are recognition, classification, segmentation problems involved in solving the challenge, which makes the challenge difficult for machines to solve easily.

An embodiment provides a system configured to improve multimedia aggregation by providing multiple images and asking users to select those that appear more than once. The challenge may also provide hints to users for selecting images. In an embodiment, the response may be an interaction on all the images being presented in the challenge. For example, the challenge may be to select all images which are owned by a single company.

In an embodiment, the system is configured to be used in other ways to utilize human computation. For example, the system may be configured to recognize and understand likes or dislikes patterns for a particular product under the constraint of a demography, gender, etc., and use the knowledge gained to solve computational problems.

In an embodiment, the system is configured to provide robust and deep analytics which may be a strong input for several decision making processes and systems.

Figure 13:
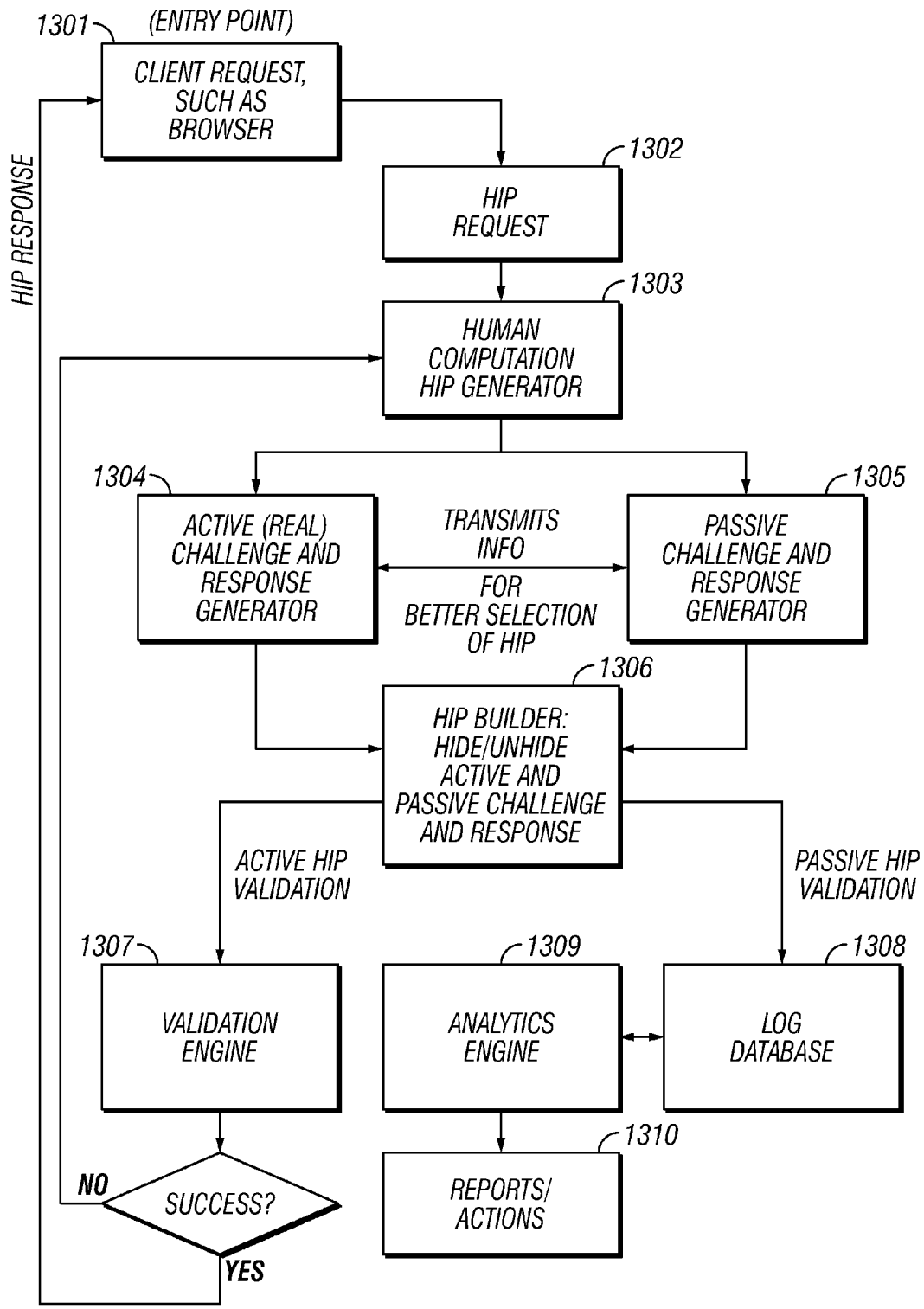
FIG. 13 is a flow diagram of creating an HIP system which can integrate some human computation methods to utilize human interactions to solve some computational problems, according to an embodiment.

An embodiment can be understood with reference to FIG. 13, a flow diagram of creating an HIP system which can integrate some human computation methods to utilize human interactions to solve some computational problems. That is, the system uses human computation methods to extract some values out of human interactions apart from using HIPs for validation of human interaction. A client 1301 sends a HIP request to a human computation HIP generator 1303, which sends control to an active (real) challenge and response generator 1304 to obtain a part of the challenge which is active and sends control to a passive challenge and response generator 1305 to obtain a part of the challenge which is passive. The active and passive parts are sent to a HIP builder 1306 which is configured to hide or unhide active and passive parts of the challenge to create a final challenge. Active HIP validation of the active parts of the challenge is performed by a VS 1307 and when validation is successful, the HIP response is sent to website or application 1301 and when validation is not successful, control returns to human computation HIP generator 1303. Passive HIP validation of passive parts of the challenge is sent to a log database 1308, which sends the validation on to an analytics server 1309. Analytics server 1309 is configured to use information about said validation in generating reports 1310.

Figure 13A:
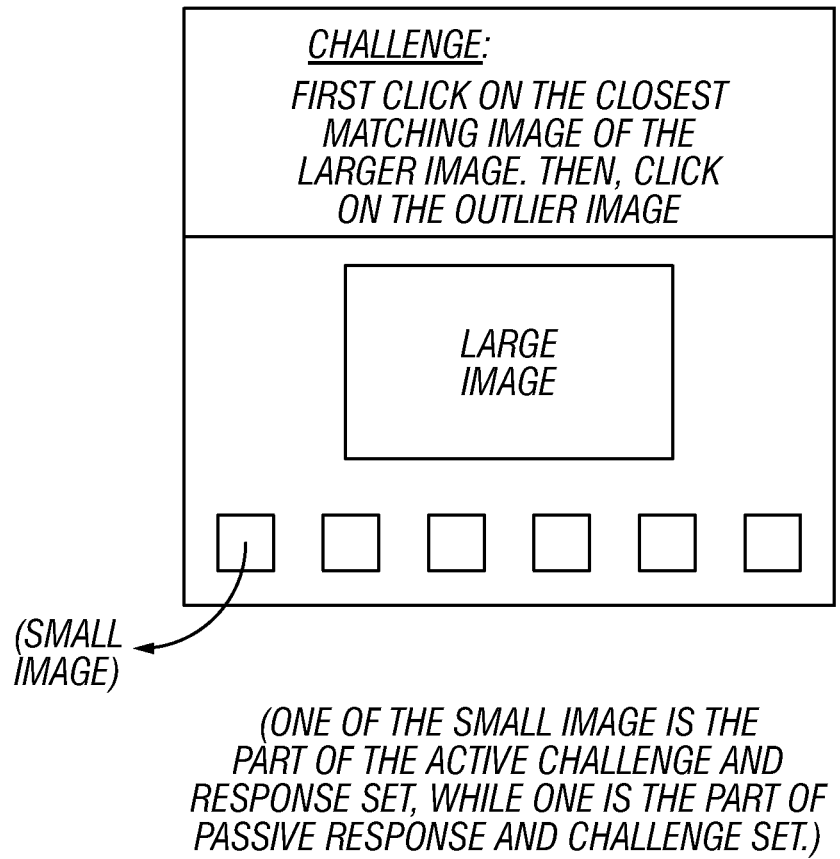
FIG. 13A is a schematic diagram of one example to find image outliers in one image sets, according to an embodiment.

FIG. 13A is a schematic diagram of one example to find image outliers in one image sets. Finding image outliers in image sets is a tough challenge for computational systems.

An Example Machine Overview

Figure 14:
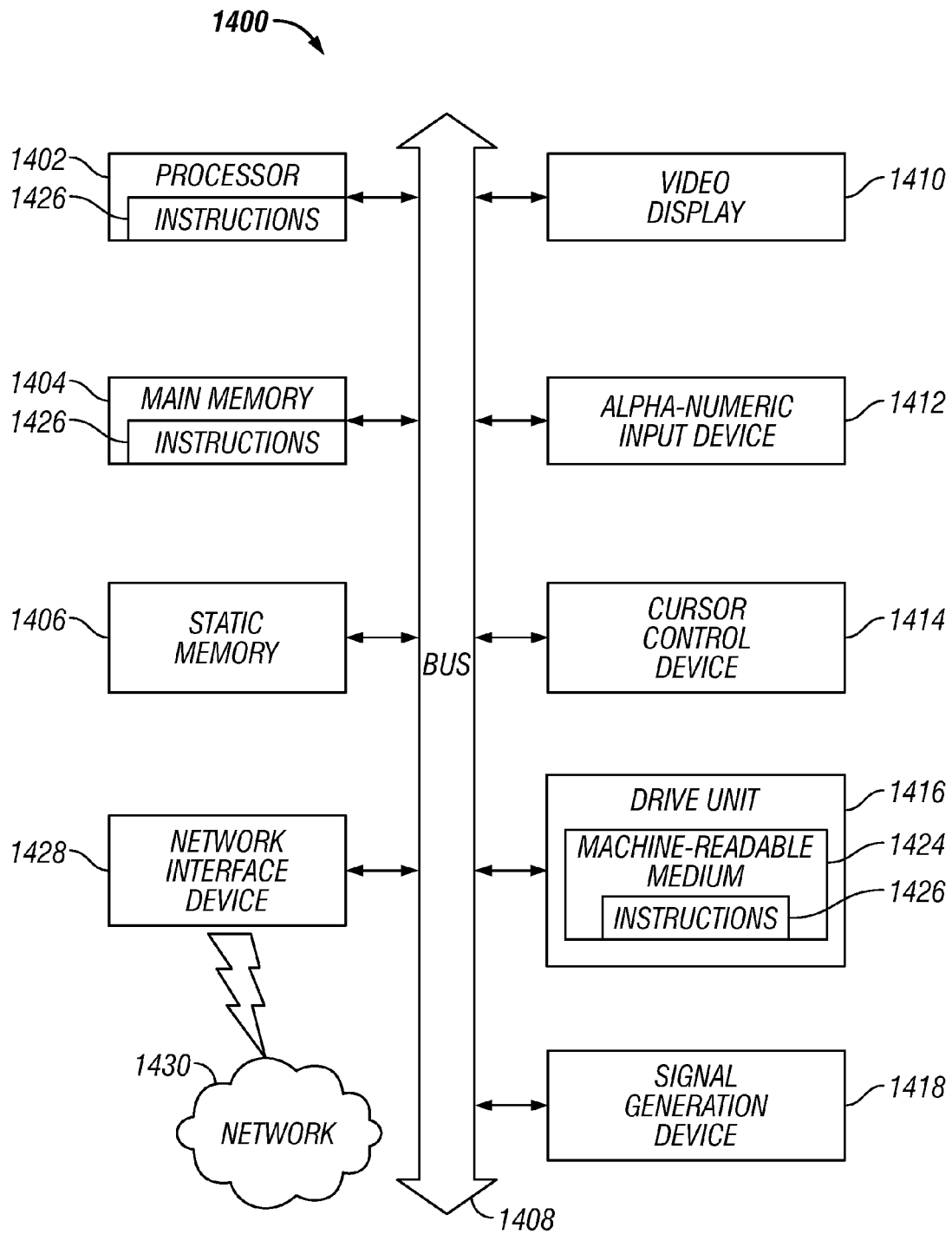
FIG. 14 is a block schematic diagram of a system in the exemplary form of a computer system, according to an embodiment.

FIG. 14 is a block schematic diagram of a system in the exemplary form of a computer system 1400 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1400 includes a processor 1402, a main memory 1404 and a static memory 1406, which communicate with each other via a bus 1408. The computer system 1400 may further include a display unit 1410, for example, a liquid crystal display (LCD) or a cathode ray tube (CRT). The computer system 1400 also includes an alphanumeric input device 1412, for example, a keyboard; a cursor control device 1414, for example, a mouse; a disk drive unit 1416, a signal generation device 1418, for example, a speaker, and a network interface device 1428.

The disk drive unit 1416 includes a machine-readable medium 1424 on which is stored a set of executable instructions, i.e. software, 1426 embodying any one, or all, of the methodologies described herein below. The software 1426 is also shown to reside, completely or at least partially, within the main memory 1404 and/or within the processor 1402. The software 1426 may further be transmitted or received over a network 1430 by means of a network interface device 1428.

In contrast to the system 1400 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing components that enable users, e.g. users on the go, to be connected to, use, create, or implement scalable and effective multi-media objects with HIP capabilities on such internet-enabled or other network-enabled devices, servers, or clients. It further should be appreciated that one or more cloud computing embodiments enabling creating and implementing or using scalable and effective multi-media objects with HIP capabilities using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for generating and serving scalable and effective multimedia objects with human interaction proof (HIP) capabilities on a webpage, comprising:
an engagement server configured to receive a request for a combined multimedia object (MMO) and challenge (HIP), said request originating from a webpage or application, and send said multimedia object and said challenge for delivery to the webpage or application, wherein the MMO comprises user-generated content inserted into the media object of the MMO and wherein the challenge combines asking a user to interact with a user device in a way that is related to the user-generated inserted content;
wherein the engagement server is further configured to receive a response to said challenge originating from the webpage or application;
wherein the engagement server is further configured to, based on said response, determine a success or failure and send a success message or a failure message, respectively, for delivery to said website or application;
wherein the engagement server is further configured to receive an acknowledgement when said message is said success message and a new request for a new multimedia object and new challenge until a predetermined threshold is met, when said message is said failure message; and
wherein the engagement server comprises:
a multimedia object server (MMOS) configured to receive said request for said multimedia object and return said corresponding MMO and challenge;
a validation server (VS) configured to determine whether said response is a success or failure by matching said response with a stored response in a challenge and response repository;
an analytics server configured to receive and store informational details about said request and receive and store details about said response from said VS;
a status server module configured to receive and record whether said response is a success or failure; and
wherein at least one of the multimedia object server, the validation server, the analytics server, and the status server module comprises:
at least one processor; and
a memory device coupled to said at least one processor;
wherein said MMO and said challenge comprise secret questions and answers created by a user and used to validate the user's identity;
wherein said secret questions are classified as belonging to particular types of advertisements (ads); and
wherein when a secret question is shown, a corresponding ad is also shown and used as a challenge.

2. The apparatus of claim 1, wherein said engagement server further comprises:
a video image integration server (VIIS) configured to receive from said MMOS a request for said MMO plus filter criteria including profile information regarding user identification, plus configured to find said MMO by performing a matching process with previously stored MMOs using said filter criteria and configured to send said MMO to said MMOS when said matching process is successful; and
wherein said MMO returned to said webpage or application comprises a video that has been previously tagged by having a particular section of the video associated to said challenge.

3. The apparatus of claim 2, wherein said video is previously tagged for secret questions by:
  uploading a video to be combined with one or more secret questions;
  optionally selecting one or more images to be added to said MMO comprising the video;
  selecting said one or more secret questions to be used when said MMO is served, wherein said one or more secret questions are to be used verify user identification;
  selecting one or more frames from said video;
    for each of said one or more frames:
      selecting a section and tagging said section and associating said tag with any of said one or more secret questions; and
      providing an answer for each of said one or more questions;
  submitting said tagged video to said MMOS and said challenge and response repository, wherein said submission comprises informational data regarding said sections, video, one or more questions, answers, user identification, password, and user profile; and
  said MMOS and said challenge and response repository storing said submitted data.

4. The apparatus of claim 2, wherein said video is previously tagged by:
  creating a profile;
  uploading a user specified video, wherein said user specified video is selected from local, public domain, or a private repository;
  using video editing software, selecting one or more frames from said video;
    for each of said one or more frames, selecting a section and tagging said section;
  storing said video in a video repository and storing metadata of said one or more frames and associated tags in a metadata repository, wherein said video and said metadata are recombined when said MMO is served.

5. The apparatus of claim 2, wherein said MMO and said challenge are created by stitching a user specified video and user defined multiple images and using the resultant multimedia as a challenge to identify the correct user, comprising:
  receiving a video file;
  splitting said video file randomly into sequences pieces;
  receiving user defined images;
  associating challenges and responses to the pieces and the images;
  stitching said images with said video pieces and creating a new video file; and
  associating said new video file to a profile,
  wherein said images within said new video file are used in said challenge.

6. The apparatus of claim 1, wherein a valid response to said challenge is a combination of interaction with an image on said MMO and a response that is dependent on content displayed on said webpage or application.

7. The apparatus of claim 1, wherein said MMO and said challenge comprise one or more interactive maps by incorporating web mapping technology and wherein said web mapping technology asks a user to identify or tag important information on said one or more interactive maps which only the user may be able to identify.

8. The apparatus of claim 1, wherein said sending said request for said MMO and said challenge further comprises: requesting for HIP, wherein it is determined whether said request is for a text based challenge or a non-text based challenge;
  when said request is for a text based challenge:
    get an MMO suitable for a text based challenge;
    determine whether the metadata available is sufficient, limited, or none;
      when said metadata available is sufficient:
        go to challenge processing data;
      when said metadata available is limited:
        ask a metadata processing engine whether it has data to use as a challenge and, if no, go to a metadata finder engine and if yes, go to challenge processing data;
      when said metadata available is none:
        go to said metadata finder engine;
      wherein said metadata finder engine determines whether there is sufficient metadata and when yes, processes challenge data and when no, discards the MMO;
      wherein after challenge processing data, go to validation processing engine and subsequently to HIP formation engine and send said MMO with said HIP to a client;
  wherein after interaction with the HIP at the client, send a response to VS to determine whether said response is valid and when yes, said client receives a positive response and when no, make a request to said browser to resend request for HIP; and
  when said request is for a non-text based challenge, get an MMO suitable for a non-text challenge and go to said step, determine whether the metadata available is sufficient, limited, or none.

9. The apparatus of claim 1, wherein said MMO and said challenge comprise hybrid challenges and wherein said hybrid challenges are created by:
  said website or application requesting HIP;
  said request being received at a traffic analyzer configured to send complexity information about the HIP to a hybrid challenge and response generator;
  wherein said hybrid challenge and response generator obtains two or more HIPs from any of a click type challenge and response generator, a drag type challenge and response generator, and a type-in text challenge and response generator;
  wherein a combined HIP generator combines said two or more HIPs;
  wherein said combined HIPs are served to a client;
  wherein after the combined HIPs are interacted with, a request for validation is sent to said VS;
  wherein when said validation is successful, said success message is sent to said webpage or application and when said validation is a failure, send said failure message to said webpage or application when a refresh threshold is expired, otherwise request HIP again at said traffic analyzer and increment a refresh counter that is used to determine when the refresh threshold expires.

10. The apparatus of claim 1, wherein said MMO and said challenge comprise HIP;
  wherein said MMO and challenge and HIP comprise known images and unknown images;
  wherein the unknown images operate as noise in said HIP and cause more difficulty for bots to find valid objects in said MMO; and wherein said known and unknown images are determined by:
   an intelligent image selector recognizing and storing known images in an image repository,
   said intelligent image selector executing a noise generator to generate unknown images having or being noise;
   said intelligent image selector storing said unknown images in a noise repository;
   said engagement server comprising a challenge and response generator which combines images from said image repository and said noise repository to create said MMO and challenge and HIP comprising known images and unknown images.

11. The apparatus of claim 1, wherein HIP is created using template based HIP building comprising:
   a template selection engine for receiving an HIP request from the webpage or application;
   said template selection engine obtaining a template from a template repository;
   said template selection engine sending said template to an object relationship selection engine;
   said object relationship engine uses intelligent classification and aggregation algorithms to populate and build relationships within elements of said template and based on said elements, picks most suitable relationships to be defined as a challenge in the HIP;
   an MMO object selection engine selects an MMO object;
   an HIP builder combines the MMO object and said defined challenge and sends said combined MMO object with said defined challenge to a client.

12. The apparatus of claim 11, wherein templates, relationships, objects, and types of interactions are encompassed as one set and a different combination of different or the same templates, relationships, objects, and types of interactions are encompassed as a different set and wherein two or more different combinations of said sets are used to create different HIPs.

13. The apparatus of claim 1, wherein said request for said MMO and said challenge comprises a HIP request and wherein sending said request for said MMO and said challenge further comprises:
   receiving by a human computation HIP generator, the HIP request, which sends control to an active (real) challenge and response generator to obtain a part of the challenge which is active and sends control to a passive challenge and response generator to obtain a part of the challenge which is passive;
   sending said active and passive parts to a HIP builder which is configured to hide or unhide active and passive parts of the challenge to create a final challenge;
   wherein active HIP validation of said active parts of said challenge is performed by said VS and when validation is successful, the HIP response is sent to said website or application and when validation is not successful, control returns to said human computation HIP generator;
   wherein passive HIP validation of said passive parts of said challenge is sent to a log database, which sends said validation on to said analytics server and wherein said analytics server is configured to use information about said validation in generating reports.

14. The apparatus of claim 1, wherein said request comprises information about a device from which said website or application are communicatively connected and said MMOS is further configured to parse and use said device information to choose said MMO and said challenge based on capabilities of said device.

15. The apparatus of claim 1, wherein said challenge is challenge asked against an image for a user to provide important information noticed in the picture in a local language and wherein related code translates internally the local language and matches with other responses of other languages which are stored in the system and when there is a match, the response is considered valid.

16. The apparatus of claim 1, wherein said MMO comprises in-premise or house-media, wherein in-premise or house-media comprise ads or any other branding or promotional marketing campaign objects owned by a company associated with said website or application or partners of said company.

17. The apparatus of claim 1, wherein the engagement server is further configured to detect if the request comes from a device that is a smart TV and to detect and determine interactions done in the smart TV and to understand such interactions as a response.

18. The apparatus of claim 1, wherein said MMO is configured to be turned on and off for said challenge in a workflow.

19. A computer-implemented method for generating and serving scalable and effective multimedia objects with human interaction proof (HIP) capabilities on a webpage, comprising the steps of:
   providing an engagement server configured to receive a request for a multimedia object (MMO) and a challenge (HIP), said request originating from a webpage or application, and send said multimedia object and said challenge for delivery to said webpage or application, wherein the MMO comprises user-generated content inserted into the media object of the MMO and wherein the challenge combines asking a user to interact with a user device in a way that is related to the user-generated inserted content;
   wherein the engagement server is further configured to receive a response to said challenge originating from the webpage or application;
   wherein the engagement server is further configured to, based on said response, determine a success or failure and send a success message or a failure message, respectively, for delivery to said website or application;
   wherein the engagement server is further configured to receive an acknowledgement when said message is said success message and a new request for a new multimedia object and new until a predetermined threshold is met, when said message is said failure message; and
   wherein the engagement server comprises:
      a multimedia object server (MMOS) configured to receive said request for said multimedia object and return said corresponding MMO and challenge;
      a validation server (VS) configured to determine whether said response is a success or failure by matching said response with a stored response in a challenge and response repository;
      an analytics server configured to receive and store informational details about said request and receive and store details about said response from said VS; and
      a status server module configured to receive and record whether said response is a success or failure;
   wherein said MMO and said challenge comprise secret questions and answers created by a user and used to validate the user's identity;

wherein said secret questions are classified as belonging to particular types of advertisements (ads); and wherein when a secret question is shown, a corresponding ad is also shown and used as a challenge.

\* \* \* \* \*